(12) United States Patent
Ingle et al.

(10) Patent No.: US 10,738,208 B2
(45) Date of Patent: Aug. 11, 2020

(54) INKJET INK COMPOSITION

(71) Applicant: Hewlett-Packard Development Company, L.P., Spring, TX (US)

(72) Inventors: David Michael Ingle, San Diego, CA (US); Phillip C. Cagle, San Marcos, CA (US); Paul J. Bruinsma, San Diego, CA (US); Howard Doumaux, San Diego, CA (US); Timothy C. Mauldin, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/329,966

(22) PCT Filed: Jan. 5, 2018

(86) PCT No.: PCT/US2018/012622
§ 371 (c)(1),
(2) Date: Mar. 1, 2019

(87) PCT Pub. No.: WO2018/144181
PCT Pub. Date: Aug. 9, 2018

(65) Prior Publication Data
US 2019/0249022 A1 Aug. 15, 2019

Related U.S. Application Data

(63) Continuation-in-part of application No. PCT/US2017/015899, filed on Jan. 31, 2017, which is a continuation-in-part of application No. PCT/US2017/015903, filed on Jan. 31, 2017, which is a continuation-in-part of application No. PCT/US2017/015907, filed on Jan. 31, 2017, application No. 16/329,966, which is a continuation-in-part of application No. PCT/US2017/027428, filed on Apr. 13, 2017, and a continuation-in-part of application No. PCT/US2017/044177, filed on Jul. 27, 2017.

(51) Int. Cl.
| | |
|---|---|
| *B41J 2/01* | (2006.01) |
| *B41M 5/00* | (2006.01) |
| *C09D 11/322* | (2014.01) |
| *C09D 11/033* | (2014.01) |
| *C09D 11/037* | (2014.01) |
| *C09D 11/107* | (2014.01) |
| *C09D 11/54* | (2014.01) |
| *C09D 11/40* | (2014.01) |
| *C08K 3/22* | (2006.01) |
| *C08K 9/02* | (2006.01) |
| *C09D 11/326* | (2014.01) |

(52) U.S. Cl.
CPC ............... *C09D 11/322* (2013.01); *B41J 2/01* (2013.01); *B41M 5/0011* (2013.01); *B41M 5/0023* (2013.01); *C09D 11/033* (2013.01); *C09D 11/037* (2013.01); *C09D 11/107* (2013.01); *C09D 11/40* (2013.01); *C09D 11/54* (2013.01); *C08K 3/22* (2013.01); *C08K 9/02* (2013.01); *C08K 2003/2227* (2013.01); *C08K 2003/2241* (2013.01); *C08K 2003/2244* (2013.01); *C08K 2003/2296* (2013.01); *C08K 2201/005* (2013.01); *C09D 11/326* (2013.01)

(58) Field of Classification Search
CPC ...... B41J 2/01; B41M 5/0011; B41M 5/0023; B41M 5/0047; B41M 5/0064; C09D 11/033; C09D 11/037; C09D 11/107; C09D 11/40; C09D 11/322; C09D 11/54; C09D 11/326; C08K 3/22; C08K 9/02; C08K 2003/2241; C08K 2003/2244; C08K 2003/2296; C08K 2201/005
See application file for complete search history.

(56) References Cited

U.S. PATENT DOCUMENTS

| | | | |
|---|---|---|---|
| 3,437,502 A | 4/1969 | Warner | |
| 4,186,178 A | 1/1980 | Oberlander | |
| 4,495,238 A * | 1/1985 | Adiletta | A62B 17/00 428/215 |

(Continued)

FOREIGN PATENT DOCUMENTS

| | | |
|---|---|---|
| EP | 0728779 | 8/1996 |
| EP | 1403341 | 3/2004 |

(Continued)

OTHER PUBLICATIONS

Disperal®/Dispal® High Purity Dispersible Aluminas, Sasol, Jan. 2003, 10 pages < http://www.sasoltechdata.com/tds/DISPERAL_DISPAL.pdf >.

(Continued)

*Primary Examiner* — Anh T Vo
(74) *Attorney, Agent, or Firm* — HP Inc. Patent Department

(57) ABSTRACT

The present disclosure refers to an inkjet ink composition comprising an ink vehicle including water; a white metal oxide pigment dispersed in the ink vehicle; and a latex binder, dispersed in the ink vehicle. The latex binder includes a first heteropolymer including two or more aliphatic (meth)acrylate ester monomers or two or more aliphatic (meth)acrylamide monomers; and a second heteropolymer including a cycloaliphatic monomer and an aromatic monomer. The present disclosure refers also to a printing method using such inkjet ink composition.

15 Claims, No Drawings

(56) References Cited

U.S. PATENT DOCUMENTS

| | | | |
|---|---|---|---|
| 5,990,202 A | 11/1999 | Nguyen et al. |
| 6,184,268 B1 | 2/2001 | Nichols et al. |
| 6,302,536 B1 | 10/2001 | Sarma et al. |
| 6,498,202 B1 | 12/2002 | Sun et al. |
| 6,709,095 B2 | 3/2004 | Sago et al. |
| 6,779,884 B1 | 8/2004 | Ma et al. |
| 6,783,580 B2 | 8/2004 | Tyvoll et al. |
| 6,906,019 B2 | 6/2005 | Nitzan et al. |
| 6,936,648 B2 | 8/2005 | Bagwell et al. |
| 7,129,284 B2 | 10/2006 | Ma et al. |
| 7,246,896 B2 | 7/2007 | Askeland et al. |
| 7,388,040 B2 | 6/2008 | Sader et al. |
| 7,696,262 B2 | 4/2010 | Cagle et al. |
| 7,744,205 B2 | 6/2010 | Sarkisian et al. |
| 8,113,643 B2 | 2/2012 | Sarkisian et al. |
| 8,114,923 B2 | 2/2012 | Sarkisian et al. |
| 8,267,505 B2 | 9/2012 | Jolly et al. |
| 8,440,742 B2 | 5/2013 | Cagle et al. |
| 8,540,358 B2 | 9/2013 | Mozel et al. |
| 8,746,869 B2 | 6/2014 | Matsuyama et al. |
| 8,777,390 B2 | 7/2014 | Bruinsma et al. |
| 8,783,842 B2 | 7/2014 | Engle et al. |
| 8,801,162 B2 | 8/2014 | Matsumoto et al. |
| 8,857,962 B2 | 10/2014 | Goto et al. |
| 9,062,217 B2 | 6/2015 | Gotou et al. |
| 9,133,355 B2 | 9/2015 | Brandstein et al. |
| 9,187,667 B2 | 11/2015 | Doumaux et al. |
| 9,278,515 B2 | 3/2016 | Sarkisian et al. |
| 2003/0087991 A1 | 5/2003 | Engel et al. |
| 2004/0063809 A1 | 4/2004 | Fu et al. |
| 2004/0166252 A1 | 8/2004 | Takashima et al. |
| 2005/0176847 A1 | 8/2005 | Cagle |
| 2005/0206705 A1 | 9/2005 | Ma et al. |
| 2006/0092251 A1 | 5/2006 | Prasad et al. |
| 2007/0084380 A1 | 4/2007 | Cagle et al. |
| 2009/0246377 A1 | 10/2009 | Robertson et al. |
| 2009/0295847 A1 | 12/2009 | Mukai et al. |
| 2010/0231671 A1 | 9/2010 | Anton et al. |
| 2011/0001779 A1 | 1/2011 | Kida |
| 2011/0071249 A1 | 3/2011 | Bui et al. |
| 2011/0234689 A1 | 9/2011 | Saito |
| 2011/0318551 A1 | 12/2011 | Nakagawa |
| 2012/0092413 A1 | 4/2012 | Kawamura |
| 2013/0072614 A1 | 3/2013 | Lindstrom et al. |
| 2013/0201252 A1 | 8/2013 | Namba |
| 2013/0330526 A1 | 12/2013 | Song et al. |
| 2014/0141212 A1 | 5/2014 | Fu et al. |
| 2014/0220315 A1 | 8/2014 | Zhang et al. |
| 2015/0225586 A1 | 8/2015 | Ingle et al. |
| 2015/0252205 A1 | 9/2015 | Sarkisian et al. |
| 2015/0267073 A1 | 9/2015 | Zhou et al. |
| 2015/0273853 A1 | 10/2015 | Govyadinov et al. |
| 2015/0275007 A1 | 10/2015 | Cagle et al. |
| 2015/0283828 A1 | 10/2015 | Aoai et al. |
| 2015/0368488 A1 | 12/2015 | Robello et al. |
| 2016/0185124 A1 | 6/2016 | Govyadinov |
| 2016/0257154 A1 | 9/2016 | Miyamachi et al. |
| 2016/0312404 A1 | 10/2016 | Pan et al. |
| 2016/0319147 A1 | 11/2016 | Chen et al. |
| 2016/0326391 A1 | 11/2016 | Doumaux et al. |
| 2016/0333209 A1 | 11/2016 | Shimono et al. |
| 2017/0355867 A1* | 12/2017 | Kasperchik .......... C09D 11/107 |

FOREIGN PATENT DOCUMENTS

| | | |
|---|---|---|
| EP | 1403342 | 3/2004 |
| EP | 1561788 | 8/2005 |
| EP | 1586454 | 10/2005 |
| EP | 1403346 | 11/2006 |
| EP | 1923435 | 5/2008 |
| EP | 2508577 | 10/2012 |
| EP | 2621731 | 8/2013 |
| JP | 2005126466 | 5/2005 |
| JP | 2014091795 | 5/2014 |
| JP | 2014240451 | 12/2014 |
| RU | 2588245 | 6/2016 |
| SU | 891732 | 12/1981 |
| WO | WO 03031191 | 4/2003 |
| WO | WO 2007112337 | 10/2007 |
| WO | WO 2009128833 | 10/2009 |
| WO | WO 2011028201 | 3/2011 |
| WO | WO 2012008978 | 1/2012 |
| WO | WO 2014042653 | 3/2014 |
| WO | WO 2015023274 | 2/2015 |
| WO | WO 2015041702 | 3/2015 |
| WO | WO 2015134020 | 9/2015 |
| WO | WO 2015142335 | 9/2015 |
| WO | WO 2016092309 | 6/2016 |
| WO | WO 2016130158 | 8/2016 |
| WO | WO 2016175738 | 11/2016 |
| WO | WO-2017009601 | 1/2017 |
| WO | WO 2017014747 | 1/2017 |
| WO | WO 2018143957 | 8/2018 |

OTHER PUBLICATIONS

International Search Report and Written Opinion for International Application No. PCT/US2018/012622 dated Apr. 12, 2018, 8 pages.

* cited by examiner

INKJET INK COMPOSITION

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for many reasons, including, low printer noise, capability of high-speed recording and multi-color recording. The ink droplets are ejected from a nozzle by the inkjet system onto the paper to produce an image thereon. The inks play a fundamental role in the image quality resulting from this printing technique. Notwithstanding their recent success, research and development efforts continue toward advancing inkjet print quality over a wide variety of different applications, but there remain challenges.

DETAILED DESCRIPTION

Before the ink compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise. Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the term "about" is used to provide flexibility to a numerical range endpoint by providing that a given value may be a little above or a little below the endpoint. The degree of flexibility of this term can be dictated by the particular variable. Unless otherwise stated, any feature described herein can be combined with any aspect or any other feature described herein.

Inkjet printing with aqueous inks is increasingly being used to print on wide variety of media, including non-porous flexible and rigid media. However, durability of aqueous inks on substrates often poses a challenge. Inks need to wet and adhere to a broad range of substrates, have good abrasion and scratch resistance, resist attack by water, cleaning fluids, and solvents, and have good outdoor weatherability. There have been great improvements in the durability of aqueous ink-jet inks through incorporation of certain ink-jet compatible latex polymer dispersions made by emulsion polymerization. When printed as part of an ink-jet ink, a latex component of the ink can form a film on a media surface, entrapping and protecting the colorant within the hydrophobic print film.

It is recognized that inkjet printing of aqueous inks on non-porous media is substantially different than inkjet applications for traditional porous paper-based media. On porous papers, ink drying occurs primarily by ink penetration into the media pore structure, and control of image quality aspects is a strong function of the rate of ink penetration into the media. Thus, optimization of the penetration rate is used for attributes such as optical density and color-to-color bleed. On non-porous media, there is no penetration of the ink into the media, i.e. the colorant remains on the surface of the media, and image quality defects resulting from wetting and ink migration across the nonporous surface are more difficult to control, especially at high printing speeds. For example, non-porous flexible or rigid media are used in product packaging, signage, and other applications.

In addition, certain pigments can be more challenging than other in achieving certain desirable printing and jetting properties. For example, ink opacity corresponding to white color appearance can be more difficult to achieve for white inks compared to black, magenta, or cyan inks. Additionally, high colorant loads and large pigment particle sizes can lead to settling that clogs inkjet print heads and other microchannels. More specifically, the combination of high bulk densities and larger particle sizes tend to lead to high settling rates of the pigment in water-based inkjet ink formulations, and these larger and denser pigments can form a sediment very rapidly, e.g., within a few days.

Thus, the present disclosure is drawn to white inks with latex, including water-based white inkjet inks, that can be jetted from various types of inkjet print heads, but which can also be friendly for use in thermal inkjet print heads. These inks, in some instances with the assistance of a fixer coating layer or fixer ink, can be printed not only on porous media, but also effectively on more challenging non-porous media.

The inkjet ink composition on the present disclosure exhibits good image quality and good image durability when used in inkjet printing devices and printed on substrates to form a printed image, specifically on non-porous substrates. Image quality performance may be measured in terms of the optical density, and durability of a printed image. The term "optical density," as referred to herein, means the ability of a printed image to reduce light rays. A higher optical density equates to better image quality performance. The term "opacity" as reference herein, means the ability of a printed image to scatter back incident light rays especially on black or colored substrates.

Durability performance may be measured in terms of the mechability and abrasion resistance of a printed image. The term "mechability," as referred to herein, is a form of durability, and means the ability of a printed image to remain undamaged when rubbed immediately after printing, such as damage from a roller on a printer. The term "abrasion resistance," as referred to herein means the ability of a printed image to remain undamaged when rubbed. High abrasion resistance can lead to good durability performance.

The ink compositions of the present disclosure also have good jettability performances. The term "decap performance," as referred to herein, means the ability of the inkjet ink to readily eject from the printhead, upon prolonged exposure to air. The decap time is measured as the amount of time that a printhead may be left uncapped before the nozzles no longer fire properly, potentially because of clogging, plugging, or retraction of the colorant from the drop forming region of the nozzle/firing chamber after evaporation occurs. The length of time a thermal inkjet pen can remain unused and uncapped before spitting would be required to form an acceptable quality ink drop is called decap time, or first drop decap time. Another decap metric is the number of spits required to get the pen healthy at a specific time interval. The longest decap time that would give acceptable first drop quality or the fewest number of spits required at any given decap time would be desirable for any given ink.

In an aspect, there is provided an inkjet ink composition. The inkjet composition may comprise an ink vehicle including water; a white metal oxide pigment dispersed in the ink vehicle; and a latex binder, dispersed in the ink vehicle, including a first heteropolymer including two or more aliphatic (meth)acrylate ester monomers or two or more aliphatic (meth)acrylamide monomers, and a second heteropolymer including a cycloaliphatic monomer and an aromatic monomer.

In an aspect there is provided a method of printing. The method of printing may comprise providing a print substrate; providing an inkjet ink composition comprising an ink vehicle including water; a white metal oxide pigment dispersed in the ink vehicle; and A latex binder, dispersed in the ink vehicle, including: a first heteropolymer including two or more aliphatic (meth)acrylate ester monomers or two or more aliphatic (meth)acrylamide monomers; and a second heteropolymer including a cycloaliphatic monomer and an aromatic monomer; inkjet printing the inkjet ink composition to the print substrate to form an ink layer disposed on the print substrate in order to form a printed image. In some other examples, the printing method described herein is using non-porous print substrate.

As used herein, "co-polymer" refers to a polymer that is polymerized from at least two monomers. A certain monomer may be described herein as constituting a certain weight percentage of a polymer. A "heteropolymer" refers to polymers derived from two or more different types of monomer. This indicates that the repeating units formed from the said monomer in the polymer constitute said weight percentage of the polymer.

As used herein, "latex," "latex polymer," or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex (i.e. a latex dispersion including latex polymer particles) is formulated within an ink, the liquid becomes part of the liquid vehicle of the ink, and thus, latex polymer can be described based on the latex particle or latex polymer solids that remain dispersed in the liquid vehicle.

As used herein, "ink vehicle" refers to the liquid fluid in which a latex polymer and a pigment are placed to form an ink. Ink vehicles may include a mixture of a variety of different agents, including, for example, surfactants, solvents, co-solvents, buffers, biocides, viscosity modifiers, sequestering agents, stabilizing agents, humectants and water.

In some examples, the ink composition described herein are especially well adapted to non-porous substrate. In some other examples, the ink composition described herein are especially well adapted to flexible or to rigid non-porous substrate. The non-porous print substrate or non-porous substrate used herein refers to media substrate with surfaces that have relatively poor water permeability and absorption. Vinyl, polypropylene, polyethylene and other plastic sheets or films, metals, coated offset media, glass, certain woods, and other similar substrates are considered to be non-porous.

Inkjet Ink Composition

Described herein is an inkjet ink composition. The inkjet ink composition comprises a white pigment, a latex polymer; and an ink vehicle. In some examples, the ink vehicle comprises water and co-solvent. In some examples, the inkjet ink composition, comprises an ink vehicle including water; a white metal oxide pigment dispersed in the ink vehicle; and a latex binder, dispersed in the ink vehicle, including: a first heteropolymer (or first heteropolymer composition) including two or more aliphatic (meth)acrylate ester monomers or two or more aliphatic (meth)acrylamide monomers; and a second heteropolymer (or second heteropolymer composition) including a cycloaliphatic monomer and an aromatic monomer. By "inkjet" it is meant herein an ink composition that could be used in printing devise using inkjet technique, which includes thermal inkjet printing and piezoelectric inkjet printing Latex Binder Polymer The inkjet ink composition of the present disclosure comprises a latex binder dispersed in an ink vehicle. The latex binder can also be referred as a latex polymer or latex particles. Each of the latex binder are latex particles including a first heteropolymer including two or more aliphatic (meth)acrylate ester monomers or two or more aliphatic (meth)acrylamide monomers; and a second heteropolymer including a cycloaliphatic monomer and an aromatic monomer. Latex polymers can be prepared using any number of methods known in the art, including but not limited to emulsion polymerization techniques where co-monomers are dispersed and polymerized in a discontinuous phase of an emulsion. The latexes can also be dispersions of polymer prepared by other techniques known to those in the art.

In the examples disclosed herein, the latex binder particles include multiple heteropolymer compositions within each individual particle. These heteropolymer compositions render the latex binder particles suitable for use in inkjet inks that can be printed on non-porous media, either rigid or flexible. One of the heteropolymer compositions may be considered a soft polymer composition, in part because it provides the polymer particle with properties that are suitable for forming printed images on flexible non-porous media. The other of the heteropolymer compositions may be considered a hard polymer composition, in part because it provides the polymer particle with properties that are suitable for forming printed images on rigid non-porous media.

In the examples disclosed herein, a particular monomer may be described as constituting a certain weight percentage of the first heteropolymer composition or of the second heteropolymer composition. This indicates that the repeating units formed from the monomer in the heteropolymer constitute the weight percentage of the heteropolymer.

The latex binder particles may be present in the inkjet ink composition in an amount ranging from about 5 wt % to about 35 wt % of a total weight of the inkjet ink composition. When the latex binder particles are incorporated into the inkjet ink composition as part of an aqueous emulsion (e.g., which also includes water), it is to be understood that these percentages account for the weight percent of solid latex binder particles or active latex binder particles in the inkjet ink composition, and does not account for the total weight percent of the aqueous emulsion that may be incorporated in the inkjet ink composition. In some examples, the inkjet ink composition includes an amount of white pigment and an amount of the latex binder particles, such that the ratio of the amount of white pigment to amount of latex binder particles by weight is in the range of about 0.1:15 to 10:5.

The latex binder particles may be referred to as latex particles. The particle size of the latex binder particles may range from about 0.06 µm (about 60 nm) to about 0.4 µm (about 400 nm). In another example, the particle size of the latex particles may range from about 0.1 µm to about 0.3 µm.

In some examples, the latex binder particles disclosed herein includes a first heteropolymer including two or more aliphatic (meth)acrylate ester monomers or two or more aliphatic (meth)acrylamide monomers; and a second heteropolymer including a cycloaliphatic monomer and an aromatic monomer.

In some other examples, the latex binder particles disclosed herein includes a first heteropolymer composition including two or more aliphatic (meth)acrylate ester monomers or two or more aliphatic (meth)acrylamide monomers; and a second heteropolymer composition including a cycloaliphatic monomer and an aromatic monomer, the cycloaliphatic monomer being selected from the group consisting of a cycloaliphatic (meth)acrylate monomer and a cycloaliphatic (meth)acrylamide monomer and the aromatic monomer being selected from the group consisting of an aromatic (meth)acrylate monomer and an aromatic (meth)acrylamide monomer.

In yet some other examples, the latex binder particles disclosed herein includes a first heteropolymer including two or more aliphatic (meth)acrylate ester monomers or two or more aliphatic (meth)acrylamide monomers; and a second heteropolymer composition having a higher glass transition temperature (Tg) than a Tg of the first heteropolymer composition, the second heteropolymer including a cycloaliphatic monomer and an aromatic monomer, the cycloaliphatic monomer being selected from the group consisting of a cycloaliphatic (meth)acrylate monomer and a cycloaliphatic (meth)acrylamide monomer and the aromatic monomer being selected from the group consisting of an aromatic (meth)acrylate monomer and an aromatic (meth)acrylamide monomer. The first heteropolymer composition may be considered the soft polymer composition and the second heteropolymers composition may be considered the hard polymer composition.

It has been found that the amount of the first heteropolymer (or first heteropolymer composition) within the latex binder impacts the ability of the ink to adequately adhere to both rigid and flexible substrates. Additionally, it has been found that while a lower percentage (e.g., less than 15 wt %) of the first heteropolymer composition may improve color maintenance during stretching, this percentage does not reduce impart flaking resistance. "Flaking resistance" as referred to herein means the ability of a printed image to not crack and/or lose adhesion from a flexible media, particularly when the media is flexed. As such, in the examples disclosed herein, the first heteropolymer composition is present in an amount ranging from about 15 wt % to about 70 wt % of a total weight of the latex binder particle; and the second heteropolymer composition is present in an amount ranging from about 30 wt % to about 85 wt % of the total weight of the latex binder. In other examples, the first heteropolymer composition is present in an amount ranging from about 30 wt % to about 40 wt % of a total weight of the latex binder particle; and the second heteropolymer composition is present in an amount ranging from about 60 wt % to about 70 wt % of the total weight of the latex binder particle. In one specific example, the first heteropolymer composition is present in an amount of about 35 wt % of a total weight of the latex binder particle; and the second heteropolymer composition is present in an amount of about 65 wt % of the total weight of the latex binder particle.

The first heteropolymer (or first heteropolymer composition) includes two or more aliphatic (meth)acrylate ester monomers or two or more aliphatic (meth)acrylamide monomers. The term "(meth)acrylate" refers to both acrylates and methacrylates. For example, "ethyl (meth)acrylate" refers to ethyl acrylate and/or ethyl methacrylate. The term "(meth) acrylamide" refers to both acrylamides and methacrylamides. For example, the term "methyl (meth)acrylamide" denotes methyl acrylamide and/or methyl methacrylamide.

In an example, in the first heteropolymer of the latex binder, the two or more aliphatic (meth)acrylate ester monomers are linear aliphatic (meth)acrylate ester monomers, cycloaliphatic (meth)acrylate ester monomers, or combinations thereof; or the two or more aliphatic (meth)acrylamide monomers are selected from the group consisting of C1 to C8 alkyl acrylamide monomers and C1 to C8 alkyl methacrylamide monomers.

As previously mentioned, the aliphatic (meth)acrylate ester monomers may be linear aliphatic (meth)acrylate ester monomers and/or cycloaliphatic (meth)acrylate ester monomers. Examples of the linear aliphatic (meth)acrylate ester monomers are selected from the group consisting of ethyl acrylate, ethyl methacrylate, benzyl acrylate, benzyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, and combinations thereof. Examples of the cycloaliphatic (meth)acrylate ester monomers are selected from the group consisting of cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof.

Examples of some specific monomer combinations used to form the first heteropolymer (or first heteropolymer composition) include methyl methacrylate, butyl acrylate, and methacrylic acid or butyl methacrylate, butyl acrylate, and methacrylic acid. In these examples, the composition may include the (meth)acrylates in an amount ranging from about 85 wt % to about 99 wt % and the (meth)acrylic acid in an amount ranging from about 1 wt % to about 15 wt %, where these weight percentages are based on the total weight solids of the composition. The type and amount of each of the two or more monomer units that are polymerized to form the first heteropolymer composition are selected so that the $T_g$ of the first heteropolymer composition ranges from about −25° C. to about 10° C. The $T_g$ of the first heteropolymer composition and the $T_g$ of the second heteropolymer composition may be defined in relation to each other, and the $T_g$ of the first heteropolymer composition is generally lower than the $T_g$ of the second heteropolymer composition.

The second heteropolymer (or second heteropolymer composition) includes the cycloaliphatic monomer and the aromatic monomer. In some examples, the second heteropolymer includes a cycloaliphatic monomer that is selected from the group consisting of a cycloaliphatic (meth)acrylate monomer and a cycloaliphatic (meth)acrylamide monomer. In some other examples, the second heteropolymer composition includes an aromatic monomer being selected from the group consisting of an aromatic (meth)acrylate monomer and an aromatic (meth)acrylamide monomer.

The cycloaliphatic monomer may be a cycloaliphatic (meth)acrylate monomer or a cycloaliphatic (meth)acrylamide monomer. In some examples, the cycloaliphatic (meth)acrylate or (meth)acrylamide monomer is a cycloaliphatic monomer having the formula (I):

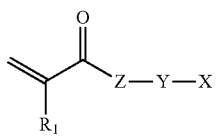

formula (I)

wherein: $R_1$ is H or methyl; Z is O (i.e., the monomer is an acrylate) or $NR_2$ (i.e., the monomer is an acrylamide) where $R_2$ is H, an alkyl or X'; Y is a bond or a carbon chain, where one or more of the carbon atoms of the carbon chain may be replaced with a heteroatom such as oxygen, sulfur, or nitrogen; and X and X' are independently cycloaliphatic moieties.

In some examples $R_2$ is an alkyl, for example C1 to C12, C1 to C10, C1 to C6, or C1 to C4 alkyls. In an example, $R_2$ is a methyl (C1 alkyl) or an ethyl (C2 alkyl). In some other examples, $R_2$ is a substituted alkyl group. In still some examples $R_2$ is H, a substituted alkyl group, or X'. Yet further $R_2$ may be H or X'. In some examples, $R_2$ is H.

In some examples, Y is a bond or a saturated or unsaturated carbon chain. In some examples, Y is a bond or a C1 to C12, for example C1 to C10, C1 to C6, or C1 to C4, carbon chain. In some examples, one or more of the carbon atoms of the carbon chain represented by Y is replaced with a heteroatom selected from oxygen, sulfur and nitrogen. In some examples, Y is a bond.

In some examples, X is a 5-12 membered ring, for example a carbon ring having 5-12 carbon atoms (i.e., a C5 to C12 ring), or a 5-12 membered heteroaliphatic ring. In some examples, X is a C5 to C12 single ring (such as cyclopentyl, cyclohexyl or cycloheptyl groups) or a bicyclic ring (such as decalin). As some specific examples, X may be a carbon ring having 5-10 carbon atoms or a carbon ring having 6-10 carbon atoms. X may also be substituted, for example, with an alkyl, alkoxy, hydroxyl, heteroalkyl, aryl, cycloaliphatic, or aromatic substituent. In some examples, X is substituted with an alkyl group (for example, a C1 to C12 alkyl group), or an aryl group (for example, a C5 to C12 aryl group), or with a heteroalkyl group (for example, a C1 to C12 heteroalkyl group).

X' is a carbon ring having 5-12 carbon atoms (i.e., a C5 to C12 ring), or a 5-12 membered heteroaliphatic ring. In some examples, X' is a C5 to C12 single ring (such as cyclopentyl, cyclohexyl or cycloheptyl groups) or a bicyclic ring (e.g., two C6 fused rings, i.e., a C10 ring, such as decalin). As specific examples, X' may be a carbon ring having 5-10 carbon atoms or a carbon ring having 6-10 carbon atoms. X' may also be substituted, for example, with an alkyl, alkoxy, hydroxyl, heteroalkyl, cycloaliphatic or aromatic substituent. In some examples, X' is substituted with an alkyl group (for example a C1 to C12 alkyl group, a C5 to C12 aryl group, a C1 to C12 heteroalkyl group.

In some examples when Z is $NR_2$ and $R_2$ is X', then X and X' may be the same.

Some specific examples of the cycloaliphatic monomer include cyclohexyl acrylate ($R_1$ is H, Z is O, Y is a bond, and X is a 6 membered ring), cyclohexyl methacrylate ($R_1$ is methyl ($CH_3$), Z is O, Y is a bond, and X is a 6 membered ring), methylcyclohexyl acrylate ($R_1$ is H, Z is O, Y is a bond, and X is a methyl-substituted 6 membered ring), methylcyclohexyl methacrylate ($R_1$ is methyl ($CH_3$), Z is O, Y is a bond, and X is a 1-methyl-substituted 6 membered ring), trimethylcyclohexyl acrylate ($R_1$ is H, Z is O, Y is a bond, and X is a 3,3,5-methyl-substituted 6 membered ring), trimethylcyclohexyl methacrylate ($R_1$ is methyl ($CH_3$), Z is O, Y is a bond, and X is a 3,3,5-methyl-substituted 6 membered ring), and combinations thereof.

The aromatic monomer may be an aromatic (meth)acrylate monomer or an aromatic (meth)acrylamide monomer. In some example, the aromatic (meth)acrylate or (meth)acrylamide monomer is an aromatic monomer having the formula (II):

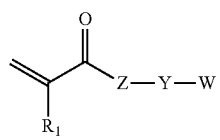

formula (II)

wherein: $R_1$ is H or methyl; Z is O (i.e., the monomer is an acrylate) or $NR_2$ (i.e., the monomer is an acrylamide) where $R_2$ is H, an alkyl or W'; Y is a bond or a carbon chain, where one or more of the carbon atoms of the carbon chain may be replaced with a heteroatom such as oxygen, sulfur, or nitrogen; and W and W' are independently aromatic moieties.

In some examples $R_2$ is an alkyl, for example C1 to C12, C1 to C10, C1 to C6, or C1 to C4 alkyls. In an example, $R_2$ is a methyl (C1 alkyl) or an ethyl (C2 alkyl). In some other examples, $R_2$ is a substituted alkyl group. In still some examples $R_2$ is H, a substituted alkyl group, or W'. Yet further $R_2$ may be H or W'. In some examples, $R_2$ is H.

In some examples, Y is a bond or a saturated or unsaturated carbon chain. In some examples, Y is a bond or a C1 to C12, for example C1 to C10, C1 to C6, or C1 to C4, carbon chain. In some examples, one or more of the carbon atoms of the carbon chain represented by Y is replaced with a heteroatom selected from oxygen, sulfur and nitrogen. In some examples, Y is a bond.

In some examples, W is a 5-12 membered aromatic ring. As examples, W may be a carbon ring having 6-12 carbon atoms (i.e., a C6 to C12 aromatic ring), or a 5-12 membered heteroaromatic ring. In some examples, W is a C5 to C12 aromatic ring, and the C5 to C12 aromatic ring may be a single aromatic ring (e.g., benzyl or phenyl) or a bicyclic aromatic ring (e.g., two C6 fused aromatic rings, i.e., a C10 aromatic ring, e.g., naphthyl). As some specific examples, W may be an aromatic carbon ring having 5-10 carbon atoms or an aromatic carbon ring having 6-10 carbon atoms. W may also be substituted, for example, with an alkyl, aryl, or heteroalkyl substituent. In some examples, W is substituted with an alkyl group (for example, a C1 to C12 alkyl group), or an aryl group (for example, a C5 to C12 aryl group), or a heteroalkyl group (for example, a C1 to C12 heteroalkyl group).

W' is an aromatic carbon ring having 5-12 carbon atoms (i.e., a C5 to C12 aromatic ring, or a 5-12 membered heteroaromatic ring. In some examples, W' is a C6 to C12 single aromatic ring (e.g., benzyl or phenyl), or a bicyclic ring (e.g., two C6 fused aromatic rings, i.e., a C10 aromatic ring, e.g., naphthyl). As specific examples, W' may be an aromatic ring having 5-10 carbon atoms or having 6-10 carbon atoms. W' may also be substituted, for example, with an alkyl group, an aryl group, or a heteroalkyl group.

In some examples when Z is $NR_2$ and $R_2$ is W', then W and W' may be the same. Some specific examples of the aromatic monomer include 2-phenoxyethyl methacrylate ($R_1$ is methyl ($CH_3$), Z is O, Y is —$CH_2$—$CH_2$—O—, and W is a 6 membered aromatic ring), 2-phenoxyethyl acrylate ($R_1$ is H, Z is O, Y is —$CH_2$—$CH_2$—O—, and W is a 6 membered aromatic ring), phenyl propyl methacrylate ($R_1$ is methyl ($CH_3$), Z is O, Y is —$(CH_2)_3$—, and W is a 6 membered aromatic ring), phenyl propyl acrylate ($R_1$ is H, Z is O, Y is —$(CH_2)_3$—, and W is a 6 membered aromatic ring), benzyl methacrylate ($R_1$ is methyl ($CH_3$), Z is O, Y is —$CH_2$—, and W is a 6 membered aromatic ring), benzyl acrylate ($R_1$ is H, Z is O, Y is —$CH_2$—, and W is a 6 membered aromatic ring), phenylethyl methacrylate ($R_1$ is methyl ($CH_3$), Z is O, Y is —$(CH_2)_2$—, and W is a 6 membered aromatic ring), phenylethyl acrylate ($R_1$ is H, Z is O, Y is —$(CH_2)_2$—, and W is a 6 membered aromatic ring), benzhydryl methacrylate ($R_1$ is methyl ($CH_3$), Z is O, Y is —CH—, and W includes two 6 membered aromatic rings), benzhydryl acrylate ($R_1$ is H, Z is O, Y is —CH—, and W includes two 6 membered aromatic rings), 2-hydroxy-3-phenoxypropyl acrylate ($R_1$ is H, Z is O, Y is —$CH_2$—CHOH—$CH_2$—O, and W is a 6 membered aromatic ring), 2-hydroxy-3-phenoxypropyl methacrylate ($R_1$ is methyl ($CH_3$), Z is O, Y is —$CH_2$—CHOH—$CH_2$—O, and W is a 6 membered aromatic ring), N-benzyl methacrylamide ($R_1$ is methyl ($CH_3$), Z is NH, Y is —$CH_2$—, and W is a 6 membered aromatic ring), N-benzyl acrylamide ($R_1$ is H, Z is NH, Y is —$CH_2$—, and W is a 6 membered aromatic ring), N,N-diphenyl methacrylamide ($R_1$ is methyl ($CH_3$), Z is NW', where W' is a 6 membered aromatic ring, Y is a bond, and W is a 6 membered aromatic ring), N,N-diphenyl acrylamide ($R_1$ is H, Z is NW', where W' is a 6 membered aromatic ring, Y is a bond, and W is a 6 membered aromatic ring), naphthyl methacrylate ($R_1$ is methyl ($CH_3$), Z is O, Y is a bond, and W is naphthyl), naphthyl acrylate ($R_1$ is H, Z is O, Y is a bond, and W is naphthyl), phenyl methacrylate ($R_1$ is methyl ($CH_3$), Z is O, Y is a bond, and W is a 6 membered aromatic ring), phenyl acrylate ($R_1$ is H, Z is O, Y is a bond, and W is a 6 membered aromatic ring), and combinations thereof.

In some examples, in the second heteropolymer (or second heteropolymer composition) of the latex binder, the cycloaliphatic monomer is selected from the group consisting of cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof; and the aromatic monomer is selected from the group consisting of 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, and combinations thereof.

In some examples, the second heteropolymer composition includes the cycloaliphatic monomer, the aromatic monomer, and an additional monomer selected from the group consisting of an unsaturated acid functional acrylate derivative, butyl acrylate, butyl methacrylate, and methyl methacrylate. Examples of the unsaturated acid functional acrylate derivative include methacrylic acid, acrylic acid, 2-sulfoethyl methacrylate, etc. The composition may include the cycloaliphatic monomer(s) in an amount ranging from about 60 wt % to about 90 wt %, the aromatic monomer(s) in an amount ranging from about 1 wt % to about 30 wt %, and when included, the additional monomer(s) in an amount ranging from about 0.1 wt % to about 10 wt %, where these weight percentages are based on the total weight solids of the composition. An example of a specific monomer combination used to form the second heteropolymer composition includes cyclohexyl methacrylate, cyclohexyl acrylate, 2-phenoxyethyl methacrylate, and methacrylic acid. Another example of a specific monomer combination used to form the second heteropolymer composition includes cyclohexyl methacrylate, cyclohexyl acrylate, 2-phenoxyethyl methacrylate, methacrylic acid and methyl methacrylate and/or butyl acrylate. In these examples, the composition may include the cycloaliphatic monomer(s) in an amount ranging from about 74 wt % to about 90 wt %, the aromatic monomer(s) in an amount ranging from about 1 wt % to about 20 wt %, and when included, the additional monomer(s) in an amount ranging from about 0.5 wt % to about 6 wt %, where these weight percentages are based on the total weight solids of the composition.

The type and amount of each of the cycloaliphatic monomer and the aromatic monomer that are polymerized to form the second heteropolymer composition are selected so that the $T_g$ of the second heteropolymer composition ranges from about 60° C. to about 110° C. The $T_g$ of the first heteropolymer composition is higher than the $T_g$ of the second heteropolymer composition.

In an example of the latex binder particle, the $T_g$ of the first heteropolymer composition ranges from about −25° C. to about 10° C.; the $T_g$ of the second heteropolymer composition ranges from about 60° C. to about 110° C.; and a $T_g$ of the latex binder particle ranges from about 25° C. to about 65° C. The glass transition temperature $T_g$ of the latex binder particle may be estimated using the Fox equation (T. G. Fox, Bull. Am. Physics Soc., Volume 1, Issue No. 3, page 123 (1956)) using the $T_g$ of the heteropolymer compositions 12, 14 forming the latex binder particle. The maximum $T_g$ of each of the heteropolymers compositions 12, 14 may be taken from literature values (for example as listed in "Polymer Handbook", edited by J. Brandrup, E. H. Immergut, and E. A. Grulke, Wiley Publishers, 4$^{th}$ edition). The glass transition temperature of the may also be determined using DSC (differential scanning calorimetry) according to ASTM D3418. Using ASTM D3418 may be less desirable, in part because this method for determining $T_g$ may be biased, as it takes into account other parameters, such as molecular weight, plasticization of the higher $T_g$ polymer by the lower $T_g$ polymer to form an intermediate $T_g$ mixture, and heating history of the actual DSC sample to determine the $T_g$. The individual amounts of the first heteropolymer composition and the second heteropolymer composition may be adjusted in accordance with the ranges provided herein in order to achieve the desired $T_g$ of the latex binder particle.

In one specific example of the latex binder particle, the first heteropolymer composition includes butyl acrylate, methyl methacrylate and methacrylic acid as the two or more aliphatic (meth)acrylate ester monomers; and the second heteropolymer composition includes cyclohexyl methacrylate and cyclohexyl acrylate as the cycloaliphatic monomers, 2-phenoxyethyl methacrylate as the aromatic monomer, and methacrylic acid as an additional monomer. In this specific example of the latex binder particle, the $T_g$ of the first heteropolymer composition ranges from about −8° C. to about −9° C.; the $T_g$ of the second heteropolymer composition ranges from about 85° C. to about 88° C.; and the latex binder particle includes about 35 wt % of the first heteropolymer composition and about 65 wt % of the second heteropolymer composition.

In some examples, the latex binder particle substantially lacks a styrene component. For example, the latex binder particle may include no more than 5% styrene (where the percentage is with respect to the total weight of the latex binder particle). In other example, the styrene (e.g., a styrene monomer) may be present in an amount of 4 wt % or less, 3 wt % or less, 2 wt % or less, 1 wt % or less, 0.5 wt % or less, or 0.1 wt % or less. In some examples, the latex polymer lacks a styrene component.

White Pigment

The ink composition of the present disclosure comprises a white metal oxide pigment dispersed in the ink vehicle. The term "white metal oxide pigment" refers to pigments that impart a white color to an ink, but may in fact be essentially colorless pigments with a high refractive index, e.g., greater than 1.6 or greater than 1.8. For example, titanium dioxide (TiO$_2$) is an example of such a pigment that imparts white color to an ink, but when viewed on a particle by particle basis, can appear colorless. This pigment solid can provide a white color due to its large size and refractive index, e.g., refractive index of 1.8 to 3.0. These pigments can also have a bulk density from 3.0 to 4.5, for example. Thus, the same properties that make this pigment a good white colorant for use in an ink also contributes to the settling characteristics for the pigment in the ink, e.g., the size of pigment and the bulk density of pigment tends to settle rather quickly. As a partial solution, coating the white metal oxide pigment with alumina and associating the surface with polymeric dispersant can be carried out. Furthermore, however, by adding amphoteric alumina particles and monovalent salt, when settling does occur, the white colorant can be easily resuspended from the white flocculated colorant mass in preparation for inkjet application. Thus, when resuspended, a homogenous or evenly distributed pigment dispersion can be readily formed from the flocculated colorant mass.

In further detail, the "white" pigment provides much of the white coloration to the ink, though without the other ingredients in the ink, individual pigment particles may have some transparency or translucency. Examples of white metal oxide pigments that can be used include titanium dioxide particles, zinc oxide particles, zirconium oxide particles, combinations thereof, or the like. In one specific example, the white metal oxide pigment can be titanium dioxide (TiO$_2$), and even more specifically, rutile. Thus, the white inks of the present disclosure are based on transparent metal oxide pigment particles with very high refractive index, that when spaced appropriately, provide very opaque and white print layers.

Pigments with high light scattering capabilities, such as these, can be selected to enhance light scattering and lower transmittance, thus increasing opacity. White metal oxide pigments can have a particulate size from about 200 nm to 700 nm, or from 300 nm to about 600 nm, or more typically, from about 400 nm to 550 nm, and in still another example, from about 180 nm to 400 nm. The combination of these pigments within these size ranges, appropriately spaced from one another with ingredients such as the alumina coating, amphoteric alumina particles, and latex particles, high opacity can be achieved at relatively thin thickness, e.g., 5 gsm to 60 gsm or 5 gsm to 50 gsm after removal of water and other solvent(s) from the printed ink and fixer film. In some examples, the white pigment dispersed in the ink vehicle; is present in an amount representing from about 5 wt % to about 25 wt % of the total ink weight.

In some other examples, the white metal oxide pigment has an average particle size ranging from about 200 nm to about 700 nm, and includes titanium dioxide particles, zinc oxide particles, zirconium oxide particles, or combinations thereof.

In some other examples, the white pigment dispersed in the ink vehicle has an alumina coating. The white metal oxide pigment can thus be an alumina-coated pigment. Thus, in some examples, the white metal oxide pigment has an alumina coating and is present in an amount representing from about 5 wt % to about 25 wt % of the total ink weight. The white metal oxide pigment can have an alumina coating which is made of alumina or of an admixture of alumina and silica.

Examples of alumina-coated pigment that can be used include Ti-Pure® R960, available from Chemours, which has an alumina content of about 3.3 wt % and an amorphous silica content of about 5.5 wt % based on the pigment content, and thus, when milled with polymeric dispersant, can form the suspended flocs, which may be easily resuspended when formulated with the amphoteric alumina particles and monovalent salts of the present disclosure. Other coated pigments that can be used include TR® 50 (2.6 wt % alumina coating), TR® 52 (3.4 wt % alumina coating), TR60 (3.1 wt % alumina coating), TR® 90 (4 wt % alumina coating), and TR® 93 (3.9 wt % alumina coating), each from Huntsman Chemical; Ti-Pure® R900 (4.3 wt % alumina coating) and Ti-Pure® R931 (6.4 wt % alumina coating), each available from Chemours; and CR®-813 (3.5 wt % alumina coating) and CR®-828 (3.5 wt % alumina coating), each available from Chemours. Notably, these coating weight percentages are based on the pigment weight, and furthermore, silica may also be included with these coatings at various concentrations either greater than or less than the alumina content. In further detail regarding the alumina coating that can be applied to the white metal oxide pigment, any of a number of alumina compositions can be used. The alumina can be coated on the pigment by precipitation from a liquid phase, and in some examples, there are commercially available alumina-containing $TiO_2$ pigments (or other white metal oxide pigments) that can be used. These commercially available pigments which include alumina can be milled with polymeric dispersant, as described in greater detail hereinafter. Thus, the white metal oxide coating can include alumina, such as alumina or an admixture of alumina and silica, e.g., amorphous-silicate (aluminosilicate). In accordance with this, an ink of the present disclosure can include an aqueous ink vehicle, and from 5 wt % to 25 wt % of white metal oxide pigment having an alumina coating, e.g., an alumina-containing coating of alumina or of amorphous-silicate (aluminosilicate which is a combination of both alumina and silica), etc.

In one example, a white metal oxide pigment, such as TiO2, can have an alumina-containing coating, aluminosilicate which is an amorphous silicate coating with both alumina and silica. Chemours® R900 is an example of a pigment that has an alumina coating, and Chemours® R960 is an example of a pigment that has an amorphous silicate coating with both alumina and amorphous silica. Thus, in accordance with examples of the present disclosure, a white metal oxide pigment can be treated with alumina (with or without silica) to form a coating, and the coated pigment can be further dispersed with a polymeric dispersing agent with added monovalent or divalent metal salt and amphoteric alumina particles also included therein Metal Salt In some examples, the white ink can further include from 0.2 wt % to 1.5 wt % monovalent metal salt, or from 0.001 wt % to 0.3 wt % divalent metal salt, or both. In some other examples, the white ink can thus further include from 0.3 wt % to 1.1 wt % monovalent metal salt, or from 0.005 wt % to 0.175 wt % divalent metal salt, or both. In one example, the monovalent salt can be present at from 0.2 wt % to 1.5 wt %, or from 0.3 wt % to 0.7 wt %, or from 0.4 wt % to 0.55 wt %. In another example, the divalent salt can be present at from 0.001 wt % to 0.3 wt %, or from 0.01 wt % to 0.15 wt %, or from 0.05 wt % to 0.13 wt %. In one example, the monovalent metal salt can include an ionic strength from 20 mM to 135 mM (millimolar or millimoles per liter), and/or divalent metal salt having an ionic strength from 1 mM to 30 mM. "Ionic strength," I, can be defined as $I = \frac{1}{2}\sum_{i=1}^{n} c_i z_i^2$ where $c_i$ is the molar concentration of the ion I (M, mol/L) and $z_i$ is the charge number of that ion. The sum can be taken over all of the ions in the solution. In further detail, with respect to colloidal stability theory, the Debye-Htickel screening length can be calculated in terms of ionic strength (rather than straight salt concentration). For negatively charged particles, it is can be observed that alkaline ions have a stronger effect than suggested by the screening length. In accordance with this, in some examples, calcium may form a complex with carboxylates on a dispersant. In more specific detail, the ionic strength of the monovalent metal salts can be from 25 mM to 80 mM, from 25 mM to 60 mM, from 25 mM to 50 mM, from 30 mM to 60 mM, or from 30 mM to 50 mM. Example monovalent salts can include $K_2SO_4$, $K_2CO_3$, KCl, KBr, $KNO_3$, $Na_2SO_4$, $Na_2CO_3$, NaCl, NaBr, $NaNO_3$, $Li_2SO_4$, $Li_2CO_3$, LiCl, LiBr, $LiNO_3$, $NaH_2PO_4$, $Na_2HPO_4$, or a combination thereof. In other examples, divalent salts can provide a stronger effect than at equivalent ionic strengths of monovalent salts. The ionic strength of divalent salt can be from 1 mM to 30 mM, from 2 mM to 30 mM, from 3 mM to 20 mM, from 5 mM to 15 mM, or from 9 mM to 24 mM. Example divalent salts can include $Ca(NO_3)_2$, $Mg(NO_3)_2$, $CaCl_2$, $MgCl_2$, or a combination thereof. Notably, the term "monovalent" refers to a single charge on the metal cation, such as potassium or sodium, and does not refer to the anion, such as nitrate or sulfate. "Divalent" also refers to the metal cation, not the corresponding anion. In some other examples, the ink of the present disclosure can comprise a monovalent metal that is selected from the group consisting of $K_2SO_4$, $K_2CO_3$, KCl, KBr, $KNO_3$, $Na_2SO_4$, $Na_2CO_3$, NaCl, NaBr, $NaNO_3$, $Li_2SO_4$, $Li_2CO_3$, LiCl, LiBr, $LiNO_3$, $NaH_2PO_4$, $Na_2HPO_4$, and a combination thereof. In yet some other examples, the ink of the present disclosure can comprise a divalent metal salt metal that is selected from the group consisting of $Ca(NO_3)_2$, $Mg(NO_3)_2$, $CaCl_2$, $MgCl_2$, and a combination thereof.

Amphoteric Alumina Particles

In another example, the ink can further include from 0.05 wt % to 0.5 wt % of amphoteric alumina particles dispersed in the aqueous ink vehicle. The amphoteric alumina particles can have an average particles size from 2 nm to less than less than 100 nm, for example. In further detail, amphoteric alumina particles alone, such as boehmite, can provide some benefit when it comes to causing a lower density settling and thus easier resuspension. However, achieving desirable settling properties using only boehmite in some instances is not always enough, particularly in some instances in inks where a diafiltered latex might also be present. To improve this, increasing the ionic strength of the ink by adding a monovalent or divalent metal salt can provide improved results compared to inks that may not include added salt. In other words, by bringing the ionic strength of metal salt in the ink (to a range of from 20 mM to 135 mM using $K_2SO_4$ or some other monovalent salt, and/or or to a range of 1 mM to 30 mM using $Ca(NO_3)_2$ or some other divalent salt) in combination with the addition of boehmite, looser and thicker sediments can be formed. This provides for inks that are more easily resuspendable after settling, generally forming reproducibly thicker sediments.

In further detail, regarding the amphoteric alumina particles, it is noted that these particles can have both cationic and anionic sites when exposed to aqueous environment over a wide pH range, and can be used as added particles in the white inks of the present disclosure. The distribution of surface charges on nano-particles of some amphoteric aluminum oxides may be anisotropic. This behavior is especially pronounced for aluminum oxo-hydroxide AlO(OH), also known as boehmite. This is because boehmite nano-particles in aqueous dispersions can easily aggregate into complex network of structures. TEM evidence of aggregation of boehmite nano-particles into continuous 3-dimensional network (viewed under magnification, e.g., ~200K) indicates the formation of these structures. Furthermore, boehmite nano-particles, and other amphoteric alumina particles, can attach or adsorb to a surface of metal oxide particles, including white metal oxide pigments described herein, to further assist with achieving the flocculated masses described herein.

In further detail, amphoteric alumina particles, such as boehmite nano-particles, can self-aggregate and adsorb to surface of large white metal oxide particles and can further be suspended in a white ink for providing controlled destabilization of white ink formulations. A variety of water-dispersible alumina nano-powders and commercially available premade alumina dispersions can be used in the formulations of the present disclosure to provide the amphoteric alumina particles. In some examples, the amphoteric alumina particles can have a particle size in the ink that is smaller than that of white metal oxide pigment, e.g., from 2 nm to less than less than 100 nm, from 2 nm to 50 nm, from 2 nm to 25 nm, or from 10 nm to about 15 nm, on average. For example, when using water-dispersible dry powders, a stock amphoteric alumina (nano) particle dispersion may be produced by milling the powder in aqueous environment at a pH from about 3.5 to about 5. The nano-particles can be premilled and added to the white ink, or can be milled with the alumina-coated white metal oxide pigment and polymeric dispersant.

In one specific example, a suitable amphoteric alumina particles (boehmite) nano-particle dispersion can be prepared by mixing Dispal® 23N4-80® alumina powder pre-acidified with nitric acid. (available from Sasol GmbH) in a mixing vat with a propeller mixer. Dispal 23N4-80 is about 80 wt % Alumina Al2O3, 1.65 wt % nitrate, and the balance water, with a combination of adsorbed water and the mineral represented by the formula AlO(OH). The slurry can include about 5 wt % to 40 wt % of the Dispal® 23N4-80® alumina, in some examples. The particle size of the amphoteric alumina particles after milling can result ranging from about 2 nm to less than 100 nm, or more specifically, from about 2 nm to less than 100 nm, or from about 10 nm to about 50 nm, on average.

In one non-limiting example, the metal oxide pigments can have an average particulate size from 200 nm to 700 nm. A dispersant can also be associated with the surface of the metal oxide pigment. Thus, in some examples, the inkjet ink composition according to the present disclosure has a dispersant associated with the surface of the white metal oxide pigment. In some other examples, the inkjet ink composition according to the present disclosure has a dispersant that includes a non-ionic or predominantly non-ionic polymeric dispersant defined by an acid number not higher than 100 mg KOH/g based on dry polymer weight, and wherein the polymeric dispersant further comprises an anionic anchoring group attached to the white metal oxide pigment or an alumina-containing coating of the white metal oxide pigment; or the dispersant includes an anionic dispersant defined by having an acid number higher than 100 mg KOH/g based on dry polymer weight attached to the alumina coating.

Regarding the polymeric dispersants per se, any of a number of polymeric dispersants can be used. For example, a short-chain anionic dispersant can be used, a non-ionic or predominantly non-ionic dispersing agent, and/or any other dispersant effective for dispersing the white metal oxide pigment. Suitable dispersing agents can allow for dispersability and stability in an aqueous ink environment, as well as for contributing to a controlled destabilizing effect (along with the alumina coating) when the white metal oxide pigment settles and forms a white flocculated colorant mass. These dispersants can also be prepared to have little to no impact on the viscosity of the liquid phase of the ink, as well as retain good print head reliability in thermal inkjet print heads (if the ink is a thermal inkjet ink). If the ink is a piezo inkjet ink, then additional flexibility regarding viscosity is tolerable. Dispersant of one or various types can each be present in the inks of the present disclosure at various concentrations, such as from 0.05 wt % to 1 wt %.

For definitional purposes, "short-chain anionic dispersants" that can be used include polymeric dispersants with chain length short enough to impact viscosity of ink formulation at moderate concentrations, typically having an acid number higher than 100 mg KOH/g based in dry polymer content. For example, short-chain anionic dispersants can include dispersants having a weight average molecular weight lower than 30,000 Mw, or more typically, lower than 15,000 Mw, e.g., 1,000 Mw to 30,000 Mw, or from 2,000 Mw to 15,000 Mw. Also for definitional purposes, "non-ionic or predominantly non-ionic dispersants" include non-ionic dispersants, as well as only weakly ionic dispersants, i.e. the acid number of the non-ionic or predominantly non-ionic/weak anionic dispersant, per dry polymer, is typically not higher than 100 mg KOH/g, and is typically not higher than 50 mg KOH/g, or even not higher than 30 mg KOH/g. That being stated, in one example, non-ionic dispersing agent with no anionic properties can be used. These non-ionic or predominantly non-ionic dispersants can range in average molecular weight from 500 Mw to 50,000 Mw, in certain examples.

Turning now to the short-chain anionic dispersants, examples include polymers and/or oligomers with low weight average molecular weight. More specifically, low molecular weight (Mw) short-chain anionic dispersants can include acrylic and methacrylic acids homopolymers such as polyacrylic acid (PAA), polymethacrylic acid (PMAA), or their salts. More specific examples include, but are not limited to, Carbosperse® K-7028 (PAA with M~2,300), Carbosperse® K-752 (PAA with M~2,000), Carbosperse® K-7058 (PAA with M~7,300), Carbosperse® K-732 (PAA with M~6,000), Carbosperse® K-752 (Na salt of PMAA with M~5,000), all available from Lubrizol Corporation. Others include Dispex® AA 4935 available from BASF Dispersions & Pigments Division, as well as Tamol® 945 available from Dow Chemical. Low molecular weight acrylic and methacrylic acid co-polymers with other carboxylic monomer moieties can also be used, such as co-polymers of acrylic and maleic acids available from Kelien Water Purification Technology Co. Low molecular weight co-polymers of carboxylic acid monomers with other water-soluble non-carboxylic acidic monomer moieties, such as sulfonates, styrenesulfonates, phosphates, etc., can also be used. Examples of such dispersants include, but are not limited to, Carbosperse® K-775 and Carbosperse® K-776 (co-polymers of acrylic and sulfonic acid), Carbosperse® K-797, Carbosperse® K-798, or Carbosperse® K-781 (co-polymers of acrylic, sulfonic acid and styrenesulfonic acid), all available from Lubrizol Corporation. Additionally, low molecular weight co-polymers of carboxylic acid monomers with some hydrophobic monomers can likewise be used. Dispersants from this group are suitable here if their acid number (content of hydrophilic acidic moieties in polymer chain) is high enough to make the dispersant well soluble in aqueous phase. Examples of such dispersants include, but are not limited to styrene-acrylic acid copolymers such as Joncryl® 671, Joncryl® 683, Joncryl® 296, or Joncryl® 690, available from BASF, as well as other water-soluble styrene-maleic anhydride co-polymer resins.

Referring now to the non-ionic dispersants that can be used, examples include water-hydrolysable silane coupling agents (SCAs) with relatively short (oligomer length range of no longer than 50 units, not longer than 30 units, or not longer than 15 units, e.g., 10 to 15 units) polyether chain(s), which are also soluble in water. An example of such a dispersant includes Silquest® A1230 polyethylene glycol methoxysilane available from Momentive Performance Materials. Other examples include soluble low-to-midrange M (e.g., usually molecular mass of the polymer less than 15,000 Da) branched co-polymers of comb-type structures with polyether pendant chains and acidic anchor groups attached to the backbone, such as Disperbyk® 190, Disperbyk® 191, Disperbyk® 193, Disperbyk® 194 N, Disperbyk® 199, Disperbyk® 2060 and Disperbyk® 2062 available from BYK Chemie, as well as Dispersogen® PCE available from Clariant. In one example, one or both of Cab-O-Sperse® K-7028 and Disperbyk® 190 can be used.

In one example, reactive hydrophilic alkoxysilane dispersants that can be present, and examples include, but are not limited to, hydrolyzable alkoxysilanes with alkoxy group attached to water-soluble (hydrophilic) moieties, such as water-soluble polyether oligomer chains, phosphate groups, or carboxylic groups. In some examples, the dispersant used to disperse the alumina coated white metal oxide pigment can be a polyether alkoxysilane or polyether phosphate dispersant. Upon dissolution in water with the alumina and the white metal oxide pigment, the alkoxysilane group of the dispersant often hydrolysis resulting in formation of silanol group. The silanol group, in turn, may react or form hydrogen bonds with hydroxyl groups of metal oxide particulate surface, as well as with silanol groups of other dispersant molecules through hydrogen bonding. These reactions lead to bonding or preferential absorption of the dispersant molecules to the metal oxide particulate surfaces and also form bonds between dispersant molecules themselves. As a result, these interactions can form thick hydrophilic coatings of reactive dispersant molecules on surface of the alumina coated white metal oxide pigment. This coating can increase the hydrodynamic radius of the particles and thus reduce their effective density and settling rate. Furthermore, the dispersant coating and the amphoteric alumina particles prevent agglomeration of the alumina coated white metal oxide pigment upon settling so that when sediment and settling does occur over time in the ink formulations, the settled pigment and other particles remain fluffy and thus are easy to redisperse upon agitation. In still further detail, these dispersants have a relatively short chain length and do not contribute significantly to the ink viscosity, even with relatively high metal oxide particulate loads, e.g. over 25 wt % white metal oxide pigment in the ink.

The amount of dispersant used to disperse the alumina coated white metal oxide pigment and other solids may vary from about 0.3% by weight to about 10% by weight of the white metal oxide pigment content. In some examples, the dispersant content range is from about 0.5 to about 4% by weight of the white metal oxide pigment content. In some other examples, the dispersant content range is from about 0.8 to about 3% by weight of the white metal oxide pigment content. In one example, it has been found that too much of an excess in the dispersant concentration may interfere with the boehmite gelling or solids flocculation effect. For example, 0.5 wt % Carbosperse® or 0.8 wt % Disperbyk® 190 based on the pigment weight can be enough to be effective and preserve the gelling effect. When the dispersed pigment is admixed in the white ink, the concentration will be lower, e.g., from 0.05 wt % to 1 wt %, based on the total ink weight.

Ink Vehicle

The ink vehicle may be a water-based vehicle (i.e., water is the main vehicle component, 50 wt % or higher) when the inkjet ink composition is for thermal inkjet printing. In some examples, the inkjet ink composition includes water in an amount of at least about 20 wt %, for example, at least about 30 wt %, or at least about 40 wt %, or at least about 50 wt %, by total weight of the inkjet ink composition. In some examples, the inkjet ink composition includes up to about 80 wt % water, for example up to about 75 wt %, up to about 60 wt %, or up to about 55 wt %, by total weight of the inkjet ink composition. In some examples, the inkjet ink composition includes water in an amount ranging from about 20 wt % to about 85 wt % by total weight of the inkjet ink composition.

Co-Solvent

The ink vehicle comprises water and a co-solvent (for example a blend of co-solvents). In some examples, the inkjet ink composition comprises the co-solvent in an amount of at least about 1 wt %, for example at least about 5 wt %, or at least about 10 wt % by total weight of the composition. In some examples, the inkjet ink composition comprises the co-solvent in an amount up to about 50 wt %, for example up to about 40 wt %, or up to about 35 wt % by total weight of the composition. In some examples the inkjet ink composition comprises a co-solvent in an amount of about 1 to about 50 wt % by total weight of the composition, for example from about 5 to about 40 wt % of the composition, or about 10 to about 35 wt % of the total weight of the composition.

In some examples, the co-solvent is a blend including a solvent having a boiling point ranging from about 170° C. to about 215° C. and a solvent having a boiling point of about 220° C. or more. The solvent having a boiling point ranging from about 170° C. to about 215° C. may itself be a blend of solvents, where each solvent of the blend has a boiling point ranging about 170° C. to about 215° C. The solvent having a boiling point of about 220° C. or more may also be a blend of solvents, where each solvent of the blend of solvents has a boiling point of about 220° C. or more. When the blend including a solvent having a boiling point ranging from about 170° C. to about 215° C. and a solvent having a boiling point of about 220° C. or more is used, the inkjet ink composition may include from about 10 wt % to about 40 wt % by total weight of the inkjet ink composition of the solvent having the boiling point in the range of about 170° C. to about 215° C. and from about 0.1 wt % to about 8 wt % by total weight of the inkjet ink composition of the solvent having the boiling point of about 220° C. or more.

In some other examples, the co-solvent is a blend including any two or more of a solvent having a boiling point ranging from about 170° C. to about 215° C., a solvent having a boiling point of ranging from about 220° C. to about 285° C., and a solvent having a boiling point greater than about 285° C. and/or being insoluble in water. In these example, the inkjet ink composition may include from about 10 wt % to about 40 wt % by total weight of the inkjet ink composition of the solvent having the boiling point in the range of about 170° C. to about 215° C., and/or from about 0.5 wt % to about 8 wt % of the solvent having the boiling point in the range of about 220° C. to about 285° C., and/or from about 0.1 wt % to about 4 wt % of the solvent having the boiling point of greater than about 285° C. and/or being insoluble in water. As one example, the co-solvent may include the solvent having a boiling point ranging from about 170° C. to about 215° C. and the solvent having the boiling point ranging from about 220° C. to about 285° C. As another example, the co-solvent may include the solvent having a boiling point ranging from about 170° C. to about 215° C. and the solvent having a boiling point of greater than about 285° C. and/or being insoluble in water. As still another example, the co-solvent may include the solvent having a boiling point ranging from about 170° C. to about 215° C., and the solvent having a boiling point ranging from about 220° C. to about 285° C., and the solvent having a boiling point of greater than about 285° C. and/or being insoluble in water.

Some examples of the ink vehicle include the solvent having a boiling point ranging from about 170° C. to about 215° C. In an example, this solvent has a boiling point ranging from about 180° C. to about 215° C. In some examples, this solvent is selected from an aliphatic alcohol, for example a primary aliphatic alcohol, a secondary aliphatic alcohol, or a tertiary aliphatic alcohol. The aliphatic alcohol may be a diol. In some examples, this solvent is an aliphatic alcohol (specifically a diol) containing 10 carbons or less, for example 8 carbons or less, or 6 carbons or less.

Specific examples of the solvent having a boiling point ranging from about 170° C. to about 215° C. may be selected from the group consisting of 1,2-propanediol, 1,2-butanediol, ethylene glycol, 2-methyl-2,4-pentanediol, 1,3-butanediol, 2-methyl-1,3-propanediol, 1,3-propanediol, and combinations thereof. In some examples the solvent having a boiling point ranging from about 170° C. to about 215° C. is selected from the group consisting of 1,2-propanediol, 1,2-butanediol, ethylene glycol, 2-methyl-2,4-pentanediol, 1,3-butanediol, and combinations thereof. In some other examples the first solvent is 1,2-butanediol. The boiling points of 1,2-propanediol, 1,2-butanediol, ethylene glycol, 2-methyl-2,4-pentanediol, 1,3-butanediol, 2-methyl-1,3-propanediol and 1,3-propanediol are listed in Table 1 below.

TABLE 1

| Solvent | Boiling point (° C.) |
|---|---|
| propylene glycol (1,2-propanediol) | 188 |
| 1,2-butanediol | 194 |
| ethylene glycol | 196 |
| 2-methyl-2,4-pentanediol (hexylene glycol) | 198 |
| 1,3-butanediol | 203 |
| 2-methyl-1,3-propanediol (MPdiol) | 213 |
| 1,3-propanediol | 214 |

In some examples, the inkjet ink composition includes at least about 5 wt % (by total weight of the inkjet ink composition) of the solvent having a boiling point ranging from about 170° C. to about 215° C. In some examples, the inkjet ink composition includes up to about 40 wt % (by total weight of the inkjet ink composition) of the solvent having a boiling point ranging from about 170° C. to about 215° C. Some examples of the ink vehicle include the solvent having a boiling point of about 220° C. or more. In some instance, this solvent may be defined having a boiling point ranging from about 220° C. to about 285° C. In other instances, this solvent may be defined as having a boiling point of greater than about 285° C. and/or as being insoluble in water. In still other examples, this solvent may include a blend of the solvent having a boiling point ranging from about 220° C. to about 285° C. and the solvent having a boiling point of greater than about 285° C. and/or being insoluble in water. The solvent having the boiling point ranging from about 220° C. to about 285° C. may be selected from alcohols (including aliphatic alcohols and aromatic alcohols), esters, glycol ethers, di- and tri-alkylene glycols, amides, lactams and sulfones. In some examples, this solvent is selected from aliphatic alcohols (including primary, secondary and tertiary aliphatic alcohols, including diols), aromatic alcohols, esters, alkylene glycol alkyl ethers (including di-, tri- and tetra-alkylene glycol alkyl ethers), glycol aryl ethers (such as alkylene glycol aryl ethers, including di- and tri-alkylene glycol aryl ethers), di- and tri-alkylene glycols, lactams (such as 2-pyrrolidinone), and sulfones (such as sulfolane or other cyclic sulfones). In some examples, the aliphatic alcohols, esters, glycol alkyl ethers, and glycol aryl ethers may have 20 carbon atoms or less (e.g., 12 carbons or less, 10 carbons or less, etc.).

Specific examples of the solvent having the boiling point ranging from about 220° C. to about 285° C. may be selected from the group consisting of ethylene glycol 2-ethylhexyl ether, dipropylene glycol n-butyl ether, diethylene glycol n-butyl ether, propylene glycol phenyl ether, 2-pyrrolidinone, tripropylene glycol methyl ether, 2,2,4-trimethyl-1,3-pentanediol monoisobutyrate, tripropylene glycol n-propyl ether, tripropylene glycol n-butyl ether, tetraethylene glycol dimethyl ether, and dipropylene glycol phenyl ether. In some examples, the solvent having the boiling point ranging from about 220° C. to about 285° C. may be selected from the group consisting of 2-pyrrolidinone, tripropylene glycol methyl ether, and tripropylene glycol n-butyl ether. The boiling points of some examples of the solvent having the boiling point ranging from about 220° C. to about 285° C. are listed in Table 2 below.

TABLE 2

| Solvent | Boiling point (° C.) |
|---|---|
| ethylene glycol 2-ethylhexyl ether (Eastman EEH) | 229 |
| dipropylene glycol n-butyl ether (Dowanol ® DPnB) | 230 |
| diethylene glycol n-butyl ether (Butyl Carbitol) | 230 |
| propylene glycol phenyl ether (Dowanol ® PPh) | 243 |
| 2-pyrrolidinone | 245 |
| tripropylene glycol methyl ether (Dowanol ® TPM) | 245 |
| 2,2,4-trimethyl-1,3-pentanediol monoisobutyrate (TEXANOL ®) | 255-261.5 |
| tripropylene glycol n-propyl ether | 261 |
| tripropylene glycol n-butyl ether (Dowanol ® TPnB) | 274 |
| tetraethylene glycol dimethyl ether (tetraglyme) | 275 |
| dipropylene glycol phenyl ether (Dowanol ® DiPPh) | 280 |

In some examples, the inkjet ink composition includes at least about 0.1 wt % (by total weight of the inkjet ink composition) of the solvent having a boiling point ranging from about 220° C. to about 285° C. In some examples, the inkjet ink composition includes up to about 8 wt % (by total weight of the inkjet ink composition) of the solvent having a boiling point ranging from about 220° C. to about 285° C.

The inkjet ink composition disclosed herein may also include the solvent having a boiling point of greater than about 285° C. and/or being insoluble in water. This solvent may remain in an ink layer printed on a media after the inkjet ink composition has been cured. In the examples disclosed herein, curing may remove at least a portion of the water, the solvent having a boiling point ranging from about 170° C. to about 215° C., and the solvent having a boiling point ranging from about 220° C. to about 285° C. When the solvent having a boiling point of greater than about 285° C. is used, it may be water-soluble (i.e., having a solubility of greater than about 10% in water). In some examples, the solubility of the water-soluble solvent having a boiling point of greater than about 285° C. may be greater than about 90%. The water-soluble solvent having a boiling point of greater than about 285° C. may be present in the inkjet ink composition in an amount ranging from about 0.1 wt % to about 4 wt % by total weight of the inkjet ink composition.

Alternatively, the solvent having a boiling point of greater than about 285° C. may be water insoluble. In still other examples, instead of a water-soluble or insoluble solvent having a boiling point of greater than about 285° C., a water insoluble solvent having a lower boiling point may be included. The term "insoluble," as used herein, refers to a solvent having a water solubility of less than about 10%, for example less than about 5%, less than about 4.5%, or less than about 4%. In some examples, it may be desirable that the water insoluble solvent having a water solubility of at least 1%. The solubility of the solvent in water may be determined as the amount of solvent by weight which may be dissolved in 100 g of water (under conditions of standard temperature and pressure) to produce a saturated solution. The solubility of the solvent in water may alternatively be determined by referring to data provided by the manufacturer. The water insoluble solvent having a boiling point of greater than about 285° C. may be present in the inkjet ink composition in an amount ranging from about 0.1 wt % to about 1 wt % by total weight of the inkjet ink composition.

The solvent having a boiling point of greater than about 285° C. and/or being insoluble in water may be selected from the group consisting of esters (such as citrates, e.g. triethyl citrate, and 2,2,4-trimethyl-1,3-pentanediol monoisobutyrate), glycol esters, glycol ether-esters, glycol ethers, lactams, phosphate ethers, and combinations thereof. In some examples, solvent having a boiling point of greater than about 285° C. and/or being insoluble in water may be selected from the group consisting of esters containing 30 carbons or less; glycol esters, such as alkylene glycol esters containing 30 carbons or less; glycol ether-esters (such as triethylene glycol n-pentyl ether benzoate, triethylene glycol n-hexyl ether benzoate, tripropylene glycol n-butyl ether benzoate, tripropylene glycol n-pentyl ether benzoate, dipropylene glycol n-butyl ether benzoate, dipropylene glycol 2-ethylhexyl ether benzoate, and dipropylene glycol phenyl ether benzoate); glycol ethers (which may contain 30 carbons or less), such as glycol aryl ethers (e.g., alkylene glycol aryl ethers, glycol phenyl ethers, etc.) and glycol alkyl ethers (e.g. alkylene glycol alkyl ethers), lactams, and phosphate ethers.

In some examples, the solvent having a boiling point of greater than about 285° C. and/or being insoluble in water is selected from the group consisting of Benzoflex 2088 (high solvating plasticizer from Eastman Chemical Co., boiling point 356° C.), Benzoflex® 50 (plasticizer from Eastman Chemical Co., boiling point 370° C.), Benzoflex® LA-705 (plasticizer from Eastman Chemical Co., boiling point >350° C.), dibutyl sebacate (boiling point 344.5° C.), Dowanol® DiPPh (dipropylene glycol phenyl ether from The Dow Chemical Co., boiling point 280° C.), Eastman® 168 (non-phthalate plasticizer from Eastman Chemical Co., boiling point 375° C.), Eastman® EEH (ethylene glycol 2-ethylhexyl ether from Eastman Chemical Co., boiling point 226° C.), Eastman® TXIB Formulation Additive (trimethyl pentanyl diisobutyrate) from Eastman Chemical Co., boiling point 281° C.), Hexamoll® DINCH® (1,2-cyclohexane dicarboxylic acid, 1,2-diisononyl ester from BASF Corp.), Loxanol® CA 5310 (propylene glycol mono oleate from BASF Corp., boiling point 284° C.), Loxanol® CA 5320 (propylene glycol monoester of C-18 fatty acids from BASF Corp.), Optifilm® 300 (C16H3004 from Eastman Chemical Co., boiling point 281° C.), Optifilm® 400 (triethylene glycol bis(2-ethylhexanoate) from Eastman Chemical Co., boiling point 374-381° C.), Texanol® ester alcohol (2,2,4-trimethyl-1,3-pentanediol monoisobutyrate from Eastman Chemical Co., boiling point 255-261.5° C.), triethyl citrate (boiling point 294° C.), triethylene glycol bis(2-ethylhexanoate) (boiling point 344° C.), tris(2-butoxyethyl)phosphate (boiling point 200-230° C.), UCAR® Filmer IBT (2,2,4-trimethyl-1,3-pentanediol monoisobutyrate from The Dow Chemical Co., boiling point 255° C.), Velate® 368 (2-ethylhexylbenzoate from Eastman Chemical Co., boiling point 297° C.), and N-(2-hydroxyethyl)-2-pyrollidinone (boiling point 140-142° C.).

In some examples, the inkjet ink composition includes at least about 0.05 wt % (by total weight of the inkjet ink composition) of the solvent having a boiling point of greater than about 285° C. and/or being insoluble in water. In some examples, the inkjet ink composition includes up to about 4 wt % (by total weight of the inkjet ink composition) of the solvent having a boiling point of greater than about 285° C. and/or being insoluble in water.

The ink vehicle may also include a variety of additional components suitable for inkjet ink compositions. These additional components may include surfactants (for example, suitable surfactants may be selected form alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amides, dimethicone copolyols, fluoroalkyl polyethylene oxides, substituted amine oxides, and the like), buffers, biocides (such as Nuosept® (Nudex Inc.), Ucarcide® (Union carbide Corp.), Vancide® (R. T. Vanderbilt Co.), Proxel® (Lonza), and combinations thereof), viscosity modifiers, sequestering agents (such as EDTA (ethylene diamine tetraacetic acid) or Trilon® M (trisodium salt of methylglycinediacetic acid from BASF Corp.) or sodium salt of polyacrylic acid), stabilizing agents, wetting agents, anti-kogation agents (e.g., for thermal inkjet inks), and/or humectants. Some specific examples of suitable surfactants include water-soluble, non-ionic surfactants (e.g., Tergitol® TMN-6, Tergitol® 15S7, and Tergitol® 15S9 from The Dow Chemical Company), a non-ionic fluoro or silicone surfactant (e.g., Capstone® fluorosurfactants from DuPont, previously known as Zonyl FSO, or BYK-348 from BYK-Chemie), and combinations thereof. Surfactants, when present, may be included in an amount ranging from about 0.01 wt % to about 10 wt % (by total weight of the inkjet ink composition), and the other additives may be present in a total amount ranging from 0 wt % to about 20 wt % (by total weight of the inkjet ink composition).

In one example, potassium sulfate can be added to the ink vehicle, as it or another monovalent salt may already be present as an electrolyte (in lower concentrations) as a byproduct of a potassium persulfate latex initiator and because of its inertness. However, it is understood that the residual amounts of this salt that may be inherently present can be less than the concentration of monovalent salt described in conjunction the present disclosure, e.g., from 5 mM to 17 mM monovalent salt based on ionic strength. Thus, the monovalent salt can be affirmatively added to reach an appropriate concentration that improves or loosens the sediment upon settling. As potassium cations may be present anionically charged particles, salt can be added at a range that is equivalent to 3.3 mM to 8 mM of potassium ions or more. Suitable monovalent metal salts that can be used include $K_2SO_4$, as mentioned, as well as $K_2CO_3$, KCl, KBr, $KNO_3$, $Na_2SO_4$, $Na_2CO_3$, NaCl, NaBr, $NaNO_3$, $Li2SO_4$, $Li_2CO_3$, LiCl, LiBr, $LiNO_3$ $NaH_2PO_4$, $Na_2HPO_4$, or combinations thereof. Alternatively (or additionally), divalent metal salt can be added to bring up the ionic strength of the salt in the ink to 1 mM to 30 mM. In one example, as calcium cations may associate with anionically charged particles, salt can be added at a range that is equivalent to 1/3 to 30/3 mM of calcium ions, without limitation. Suitable salts that can be used include $Ca(NO_3)_2$, as mentioned, as well as $Mg(NO_3)_2$, $CaCl_2$, and $MgCl_2$.

Method of Printing

Also disclosed herein in a method of inkjet printing that utilizes the inkjet ink composition disclosed herein. The method of printing may include inkjet printing the inkjet ink composition as described herein onto a print substrate to form an inkjet ink layer on the print substrate. The ink layer formed on the print substrate includes the inkjet ink composition, including the ink vehicle, the white pigment, and the latex binder particles.

In some examples, the method of printing comprises: providing a print substrate; providing an inkjet ink composition comprising an ink vehicle including water; a white metal oxide pigment dispersed in the ink vehicle; and a latex binder, dispersed in the ink vehicle, including: a first heteropolymer including two or more aliphatic (meth)acrylate ester monomers or two or more aliphatic (meth)acrylamide monomers; and a second heteropolymer including a cycloaliphatic monomer and an aromatic monomer; inkjet printing the inkjet ink composition to the print substrate to form an ink layer disposed on the print substrate.

In some other examples, the method of printing further comprises a pre-treatment of the print substrate with an aqueous pre-treatment fluid comprising a cationic polymer and a pre-treatment vehicle. Thus, in some examples, there is provided a method of printing comprising: providing a substrate; applying an aqueous pre-treatment fluid comprising a cationic polymer and a pre-treatment vehicle to the substrate to form a pre-treatment layer; providing an inkjet ink composition comprising an ink vehicle including water; a white metal oxide pigment dispersed in the ink vehicle; and a latex binder, dispersed in the ink vehicle, including: a first heteropolymer including two or more aliphatic (meth) acrylate ester monomers or two or more aliphatic (meth) acrylamide monomers; and a second heteropolymer including a cycloaliphatic monomer and an aromatic monomer; and inkjet printing the inkjet ink composition to the print substrate to form an ink layer disposed on the print substrate.

In yet some other examples, the method of printing further comprises a post-treatment of the ink layer with an aqueous overcoat composition comprising a latex polymer, a wax and an overcoat vehicle. Thus, in some examples, there is provided a method of printing comprising: providing a substrate; providing an inkjet ink composition comprising an ink vehicle including water; a white metal oxide pigment dispersed in the ink vehicle; and a latex binder, dispersed in the ink vehicle, including: a first heteropolymer including two or more aliphatic (meth)acrylate ester monomers or two or more aliphatic (meth)acrylamide monomers; and a second heteropolymer including a cycloaliphatic monomer and an aromatic monomer; inkjet printing the inkjet ink composition to the print substrate to form an ink layer disposed on the print substrate in order to form a printed image; and inkjet printing an aqueous overcoat composition comprising a latex polymer, a wax and an overcoat vehicle over the formed printed image.

In some other examples, the method of printing further comprises a pre-treatment of the print substrate with an aqueous pre-treatment fluid comprising a cationic polymer and a pre-treatment vehicle and a post-treatment of the formed printed image with an aqueous overcoat composition comprising a latex polymer, a wax and an overcoat vehicle. Thus, in some examples, there is provided a method of printing comprising: providing a substrate; applying an aqueous pre-treatment fluid comprising a cationic polymer and a pre-treatment vehicle to the substrate to form a pre-treatment layer; providing an inkjet ink composition comprising an ink vehicle including water; a white metal oxide pigment dispersed in the ink vehicle; and a latex binder, dispersed in the ink vehicle, including: a first heteropolymer including two or more aliphatic (meth)acrylate ester monomers or two or more aliphatic (meth)acrylamide monomers; and a second heteropolymer including a cycloaliphatic monomer and an aromatic monomer; inkjet printing the inkjet ink composition to the print substrate to form an ink layer disposed on the print substrate in order to form a printed image; and inkjet printing an aqueous overcoat composition comprising a latex polymer, a wax and an overcoat vehicle over the formed printed image to form an overcoat layer.

In some examples, the media used herein is a non-porous print substrate (e.g., a flexible non-porous print substrate or a rigid non-porous print substrate). The method of printing comprises: providing a non-porous print substrate; providing an inkjet ink composition comprising an ink vehicle including water; a white metal oxide pigment dispersed in the ink vehicle; and a latex binder, dispersed in the ink vehicle, including: a first heteropolymer including two or more aliphatic (meth)acrylate ester monomers or two or more aliphatic (meth)acrylamide monomers; and a second heteropolymer including a cycloaliphatic monomer and an aromatic monomer; inkjet printing the inkjet ink composition to the non-porous print substrate to form an ink layer disposed on the non-porous print substrate.

The method of printing may further include curing the latex binder particles in the ink layer on the print substrate. Curing of the latex binder particles forms a film of latex on the surface of the print substrate. The film of latex improves the durability, stretchability, color retention after stretching, and adhesion of the image printed using the inkjet ink composition.

In some examples, the method comprises heating the pre-treatment layer, ink layer and overcoat layer, when present, disposed on the substrate to cure the latex polymers to form a latex polymer film disposed on the substrate. In some examples, the method may comprise applying the aqueous pre-treatment fluid, aqueous ink composition and aqueous ink composition to the substrate in any order. In some examples, the aqueous pre-treatment fluid, aqueous ink composition and aqueous ink composition may be applied in-line to the substrate. In some examples, the aqueous pre-treatment fluid is inkjet-printed to the print substrate. The 'printed composition' referred to below comprises the pre-treatment layer, ink layer and overcoat layer (for example, formed in any order) on the print substrate. In some examples, the method of printing comprises curing the latex polymer, for example curing the latex polymer (e.g. the latex polymer of the ink composition and the latex polymer of the overcoat composition) on the print substrate (e.g. non-porous print substrate). Curing of the latex polymer forms a film of latex on the surface of the print substrate. Curing the latex polymer to form a film of latex on the print substrate improves the durability of an image printed using the inkjet-printed system described herein.

In some examples, curing the latex polymer comprises evaporating water from the printed composition. In some examples, curing the latex polymer comprises evaporating water and at least a portion of the co-solvent from the printed composition. Evaporation of water and at least a portion of the co-solvents allows latex polymer particles within the printed composition to coalesce into a film ("cure"). Evaporation may be facilitated in a printing system by providing heat and/or airflow. Heating may be either conductive, radiative, or convective. Airflow may comprise parallel or impinging airflow. In some examples, heating the ink layer to evaporate water, for example water and at least a portion of co-solvents comprises heating the printed composition such that the temperature of the print substrate is maintained below a temperature at which deformation (e.g. warping) of the print substrate occurs. For example, heating the ink layer such that the print substrate reaches a temperature of less than about 70° C., for example about 65° C. or less.

In some examples, curing the latex polymer comprises evaporating substantially all of the water from the printed composition, for example evaporating at least about 95 wt %, for example at least about 99 wt %, or at least about 99.5 wt % of the water comprised in the inkjet ink composition printed as the printed composition. In some examples, curing the latex polymer comprises evaporating all of the water from the ink layer so that no water remains in the printed composition. In some examples, curing the latex polymer comprises heating the latex polymer such that latex polymer particles coalesce to form a latex polymer film. Forming a latex polymer film occurs after evaporation of water from the printed composition and at least partial evaporation of the co-solvents. Forming a latex polymer film may comprise heating the printed composition to a temperature greater that the MFFT of the latex polymer in the printed composition. In some examples, forming a latex polymer film comprises heating the printed composition to a temperature greater that the MFFT of the latex polymer in the printed composition and a temperature less than a temperature which may cause deformation of the print substrate.

The ink composition described herein are especially well adapted to non-porous substrate. In some other examples, the ink composition described herein are especially well adapted to flexible or to rigid non-porous substrate. Thus, in some examples, the media used in the printing method described herein is non-porous print substrate. In some other examples, the media used in the printing method are low energy surface media. In yet some other examples, the media used in the printing method are flexible non-porous media or rigid non-porous media.

The non-porous print substrate or non-porous substrate used herein refers to media substrate with surfaces that have relatively poor water permeability and absorption. Vinyl, polypropylene, polyethylene and other plastic sheets or films, metals, coated offset media, glass, certain woods, and other similar substrates are considered to be non-porous. The term "non-porous media" refers to print media which has a Bristow Test of less than 2 ml/m2 at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 by 15-mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed rotating at constant speed, the test solution applicator is brought into contact with the rotating test specimen and held in place under defined pressure. The test fluid is transferred from the test solution applicator onto the test specimen in a band whose width, controlled by the applicator slot width is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry.

Low energy surface media include polyolefinic media (polypropylene or polyethylene). These media may be factory modified to facilitate wetting by inks (e.g. aqueous inkjet inks); generally, this modification increases the surface energy, but relative to other substrates they remain 'low'. Surface energy, for example surface energy with respect to aqueous inks, may be measured by contact angle between the substrate and water. In some examples, a low energy surface media is a media (i.e. print substrate) having a surface energy of less than about 40 dyne/cm, for example less than about 35 dyne/cm. The surface energy of a print substrate may be measured according to ASTM D2578.

As used herein, the term "flexible non-porous media" refers to a medium that can be fed from a roll without cracking, breaking, ripping, etc. In an example, the flexible non-porous media may be fed from one media roll through the printer to another media roll (e.g., a take-up roll). Examples of the flexible non-porous media include self-adhesive vinyl (SAV, which is a plasticized poly(vinyl chloride) (PVC) often used in vehicle wraps, examples of which include 3M IJ180c Controltac cast SAV, Avery MPI 1005 cast SAV, and Avery MPI 2903 calendared SAV), polyethylene terephthalate (PET), synthetic paper (also known as "plastic paper", which includes compounded polypropylene, examples of which are commercially available from Yupo Corp.), etc. The soft polymer composition in the polymer particles disclosed herein is able to adhere to flexible non-porous media. As such, a printed image formed from an ink including the polymer particles is at least substantially resistant to flaking (i.e., ink chipping off of the media, e.g., when exposing to creasing, bending, etc.).

Also, as used herein, the term "rigid non-porous media" refers to a medium that is commonly pre-cut to a size that may then be fed through a printer or that may rest on a flat supporting structure or bed while a printing module scans across the surface while applying ink by a digital means (e.g., pen or inkjet module). Rigid media may show indications of flexibility, but generally cannot be fed from a roll without cracking, breaking, ripping, etc. Examples of the rigid non-porous media include polypropylene, acrylics, polycarbonate, coated aluminum with a polyethylene (PE) core, wood, glass, etc. Examples of polypropylene include IntePro® Fluted Polypropylene, Coroplast® Corrugated Plastic Sheets, Correx Fluted Display Board, and BiPrint® corrugated sheets.

Pre-Treatment Fluid

The aqueous pre-treatment fluid comprises a cationic polymer and a pre-treatment vehicle. In some examples, the aqueous pre-treatment fluid comprises a cationic polymer, a pre-treatment vehicle and a surfactant. As used herein, the term "pre-treatment fluid" composition designates any fluid composition that can be printed onto a media before the application of an ink composition. Such pre-treatment fluid composition can also be called fixer composition or pre-treatment fixing composition. In theory, pre-treatment may render media more suitable for printing with aqueous-based inks. Pre-treatment compositions are often substantially colorless liquids that interact with the colorant and/or with polymeric components of the ink composition in order to precipitate the colorants or otherwise fix the ink composition to the print media surface. The precipitated colorants tend to deposit on the surface of the recording medium, which contributes to the enhancement of image quality attributes, such as, for example, good optical density.

As used herein, the term "cationic polymer" refers to an ionic polymer where the specific ions are cationic in nature, e.g. a quaternized polyamine. Polymeric cationic polymers, also referred to as cationic polyelectrolytes, may contain either guanidinium or fully quaternized ammonium functionalities, such as quaternized polyamine copolymers. In some examples, the cationic polymer does not contain primary or secondary ammonium functionalities, such as polyallylamine or polyethylene imine, due to yellowing issues in outdoor exposure. The weight average molecular weight (Mw) of the cationic polymer may allow viscosity less than 25 cP at 25° C., as measured on a Brookfield viscometer. In some examples, the Mw are less than 500,000, for example less than 50,000. In some examples, the aqueous pre-treatment fluid comprises a cationic polymer in an amount in the range of about 0.1 wt % to about 25 wt %, for example, 0.5 wt % to about 10 wt %, for example 0.5 wt % to about 5 wt %, or about 1 wt % to about 2.5 wt % by total weight of the aqueous pre-treatment fluid. Classes of cationic polymers that can be used include, for example, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other anions. An example of a suitable cationic polymer is Floquat® FL2350, a quaternized polyamine derived from epichlorohydrin and dimethyl amine, commercially available from SNF Inc.

The aqueous pre-treatment fluid may comprise non-ionic, cationic, and/or anionic surfactants. In some examples, the surfactant may be present in an amount ranging from 0.01 wt % to 10 wt % by total weight of the pre-treatment fluid, for example 0.01 wt % to 5 wt %. Cationic and nonionic surfactants are generally used, as many anionic surfactants can give solubility issues in the presence of a cationic polymer. For example, suitable surfactants may be selected form alkyl polyethylene oxides, alkyl phenyl polyethylene oxides, polyethylene oxide block copolymers, acetylenic polyethylene oxides, polyethylene oxide (di)esters, dimethicone copolyols, fluoroalkyl polyethylene oxides, and the like. In some examples, the aqueous pre-treatment fluid can include a cationic surfactant, nonionic surfactant, fluorosurfactant, silicone surfactant, and mixtures thereof. In some examples, the aqueous pre-treatment fluid can include a nonionic silicone and/or fluorosurfactant.

In some examples, the aqueous pre-treatment fluid may comprise additives such as biocides (such as Nuosept® (Nudex® Inc.), Ucarcide® (Union carbide Corp®), Vancide® (R.T. Vanderbilt® Co.), Proxel® (Lonza®), and combinations thereof), viscosity modifiers, materials for pH adjustment, sequestering agents (such as EDTA (ethylene diamine tetraacetic acid)), preservatives, and the like.

The aqueous pre-treatment fluid comprises a pre-treatment vehicle. In some examples, the pre-treatment vehicle comprises water and a co-solvent. In some examples the aqueous pre-treatment fluid comprises a co-solvent in an amount of about 1 to about 50 wt % by total weight of the pre-treatment fluid, for example from about 1 to about 40 wt % of the pre-treatment fluid, or about 5 to about 30 wt % of the total weight of the pre-treatment fluid. In some examples, the pre-treatment vehicle comprises a co-solvent having a boiling point ranging from 160° C. to 250° C. In some examples, the pre-treatment vehicle comprises a co-solvent having a boiling point ranging from 170° C. to 220° C., for example from 170° C. to 215° C.

In some examples, the co-solvent present in the pre-treatment vehicle may be selected form organic co-solvents including aliphatic alcohols, aromatic alcohols, diols, glycol ethers, polyglycol ethers, caprolactams, formamides, acetamides, and long chain alcohols. In some examples, the co-solvent may be selected form primary aliphatic alcohols, secondary aliphatic alcohols, 1,2-alcohols, 1,3-alcohols, 1,4-alcohols, 1,5-alcohols, ethylene glycol alkyl ethers, propylene glycol alkyl ethers, higher homologs ($C_6$-$C_{12}$) of polyethylene glycol alkyl ethers, pyrrolidinones, N-alkyl caprolactams, unsubstituted caprolactams, both substituted and unsubstituted formamides, both substituted and unsubstituted acetamides, and combinations thereof. In some examples, the co-solvent is selected from an aliphatic alcohol, for example a primary aliphatic alcohol, a secondary aliphatic alcohol or a tertiary aliphatic alcohol. The aliphatic alcohol may be a diol. In some examples, the co-solvent is an aliphatic alcohol containing 10 carbons or less, for example 8 carbons or less or 6 carbons or less. In some examples, the first solvent is an aliphatic alcohol being a diol containing 10 carbons or less, for example 8 carbons or less or 6 carbons or less. In some examples, the co-solvent is selected from the group comprising 1,2-propanediol, 1,2-butanediol, ethylene glycol, 2-methyl-2,4-pentanediol, 1,3-butanediol, 2-methyl-1,3-propanediol and 1,3-propanediol. In some examples the co-solvent is selected from the group comprising 1,2-propanediol, 1,2-butanediol, ethylene glycol, 2-methyl-2,4-pentanediol, and 1,3-butanediol. In some examples the first solvent is selected from the group consisting of 1,2-propanediol, 1,2-butanediol, ethylene glycol, 2-methyl-2,4-pentanediol, 1,3-butanediol, 2-methyl-1,3-propanediol and 1,3-propanediol. In some examples the co-solvent is selected from the group consisting of 1,2-propanediol, 1,2-butanediol, ethylene glycol, 2-methyl-2,4-pentanediol, and 1,3-butanediol. In some examples the co-solvent is 1,2-butanediol.

In some examples, the aqueous pre-treatment fluid comprises: about 0.1 wt % to about 25 wt % of a cationic polymer by total weight of the pre-treatment fluid; and a pre-treatment vehicle comprising water and about 1 to about 50 wt % by total weight of the pre-treatment fluid of a co-solvent having a boiling point in the range of about 170° C. to about 215° C.

Inkjet Overcoat Composition

In some examples, the aqueous inkjet overcoat composition comprises a latex polymer, a wax and an overcoat vehicle. As used herein, the term "overcoat composition" composition designates any fluid composition that can be printed onto a media after the application of an ink composition; such post-treatment composition can also be called varnish composition or post-treatment fixing composition or over-print composition. The overcoat composition is a composition that is designed to be applied over a printed image. As overcoat or varnish composition, it is meant herein a composition that will be applied over the printed image and that can form a transparent, protective film. Said vanish composition can also be considered as a post-printing or over-printing composition. The terms "over-printing" or "post-printing" refer to processes of printing where a first printing solution is printed onto a substrate, and subsequently, a second printing solution is printed onto the first printed solution. The second printing solution would be said to be over-printed with respect to the first printing solution The aqueous inkjet overcoat composition can comprise a latex polymer comprising a (meth)acrylate or (meth)acrylamide polymer or copolymer. In some example, the aqueous inkjet overcoat composition comprises a latex polymer comprising a (meth)acrylate polymer or copolymer. In some examples, the latex polymer comprises a (meth)acrylate/(meth)acrylamide polymer or copolymer. In some examples, the latex polymer comprises a (meth)acrylate/(meth)acrylamide copolymer. For example, the latex polymer may comprise a copolymer of a (meth)acrylate/(meth)acrylamide monomer and another vinyl monomer, for example another vinyl monomer selected from styrenes, $C_1$ to $C_8$ alkyl methacrylates, $C_1$ to $C_8$ alkyl acrylates, ethylene glycol methacrylates and dimethacrylates, methacrylic acids, acrylic acids, and combinations thereof. In some examples, the latex polymer of the overcoat composition comprises linear (meth)acrylate monomers or linear (meth)acrylamide monomers. The term "linear" is used to refer to monomers comprising a (meth)acrylate/(meth)acrylamide moiety linked to a non-cyclic moiety. In some examples, the linear (meth)acrylate monomers or linear (meth)acrylamide monomers may be linear aliphatic (meth)acrylate/(meth)acrylamide monomers. In some examples, linear (meth)acrylate/(meth)acrylamide monomers comprise alkyl ((meth)acrylate/(meth)acrylamide monomers (for example $C_1$ to $C_8$ alkyl (meth)acrylate/(meth)acrylamide monomers). In some examples, the latex polymer comprises methyl (meth)acrylate monomers, for example a copolymer comprising methyl (meth)acrylate monomers. In some examples, the latex polymer comprises methyl (meth)acrylamide monomers, for example a copolymer comprising methyl (meth)acrylamide monomers. In some examples, the inkjet overcoat composition comprises up to about 30 wt % latex polymers by total weight of the inkjet overcoat composition.

In some examples, the inkjet overcoat composition comprises from about 1 wt % to about 35 wt % latex polymers by total weight of inkjet overcoat composition. In some examples, the inkjet overcoat composition comprises from about 2 wt % to about 30 wt % latex polymers by total weight of the inkjet overcoat composition. In some examples, the inkjet overcoat composition comprises from about 5 wt % to about 25 wt % latex polymers by total weight of the inkjet overcoat composition. In some examples, the inkjet overcoat composition comprises from about 5 wt % to about 20 wt % latex polymers by total weight of the inkjet overcoat composition. In some examples, the inkjet overcoat composition comprises from about 5 wt % to about 12 wt % latex polymers by total weight of the inkjet overcoat composition. In some examples, the inkjet overcoat composition comprises from about 5 wt % to about 8 wt % latex polymers by total weight of the inkjet overcoat composition.

In some examples, the latex polymer has a glass transition temperature in the range of about 20° C. to about 100° C., for example about 30° C. to about 90° C., about 50° C. to about 90° C., or about 55° C. to about 70° C. The glass transition temperature (Tg) of the latex polymer may be estimated using the Fox equation (T. G. Fox, Bull. Am. Physics Soc., Volume 1, Issue No. 3, page 123 (1956)) using the Tg of the homopolymers of each of the monomers forming the copolymer of the latex polymer. The maximum Tg of each of the homopolymers of each of the monomers making up to copolymer of the latex polymer may be taken from literature values (for example as listed in "Polymer Handbook", edited by J. Brandrup, E. H. Immergut, and E. A. Grulke, Wiley Publishers, $4^{th}$ edition). The glass transition temperature of the latex polymer may also be determined using DSC (differential scanning calorimetry) according to ASTM D3418.

The aqueous inkjet overcoat composition may comprise a wax. In some examples, the wax can have a melting point ranging from 60° C. to 110° C. Generally, the wax can have a particle size ranging from 50 nm to 600 nm. In some examples, the wax can have a particle size ranging from 200 nm to 300 nm. In some examples the wax is present in the overcoat composition in an amount ranging from 0.25 wt % to 5 wt % by total weight of the overcoat composition. In some examples, the wax is present in an amount from 0.5 wt % to 4 wt %, in some examples form about 1 wt % to about 3 wt %. The wax may be provided as wax emulsions. Wax emulsions are commercially available from a number of vendors, for example Keim-Additec, Lubrizol, Michelman, and BYK Chemie. Wax emulsions that are useful in this invention include but are not limited to: Lubrizol: Liquilube® 411, Liquilube® 405, Liquilube® 488, Liquilube® 443, Liquilube® 454; Michelman: ME80825, ME48040, ME98040M1, ME61335, ME90842, ME91240, ML160; Keim-Additec: Ultralube® E-521/20, Ultralube® E-7093, Ultralube® 7095/1, Ultralube® E-8046, Ultralube® E-502V, Ultralube® E-842N: Byk: Aquacer® 2650, Aquacer® 507, Aquacer® 533, Aquacer® 515, Aquacer® 537, Aquaslip® 671, Aquaslip® 942. The overcoat vehicle may comprise water and a co-solvent. The co-solvent of the overcoat vehicle may be as described for the co-solvent of the inkjet ink composition.

The printing method may be accomplished using a high-speed printing apparatus at print speeds of at least 50 fpm, and up to 1000 fpm. Examples of suitable high-speed printing apparatuses include thermal inkjet printers or web presses, piezoelectric inkjet printers or web presses, or continuous inkjet printers or web presses.

In some examples, the fixer, the ink and the over-coat composition disclosed herein, are established on at least a portion of a print media or substrate to form an image (i.e., text, graphics, etc.) using a printing technique. The amount of fixer and ink used depends, at least in part, on the desirable image to be formed. The ink composition may be deposited, established, or printed on the printable medium using any suitable printing device. In some examples, the ink composition is applied to the printable medium via inkjet printing techniques. The ink may be deposited, established, or printed on the medium via continuous inkjet printing or via drop-on-demand inkjet printing, which includes thermal inkjet printing and piezoelectric inkjet printing. The resulting printed image will have, for examples, enhanced image quality and image permanence.

Printing System

In an aspect there is provided an inkjet printing system comprising: an aqueous pre-treatment fluid comprising a cationic polymer and a pre-treatment vehicle; an aqueous inkjet ink composition comprising an ink vehicle including water; a white metal oxide pigment dispersed in the ink vehicle; and a latex binder, dispersed in the ink vehicle, including a first heteropolymer including two or more aliphatic (meth)acrylate ester monomers or two or more aliphatic (meth)acrylamide monomers; and a second heteropolymer including a cycloaliphatic monomer and an aromatic monomer; and an aqueous inkjet overcoat composition comprising a latex polymer, a wax and an overcoat vehicle.

The printing systems described herein have been found to provide inkjet-printed images having improved durability along with maintenance of color of the inkjet ink composition. The present inventors have also found that print head reliability (e.g. decap performance) and fluidic efficiency can be improved using the printing systems described herein. It is to be understood that this disclosure is not limited to the particular processes and materials disclosed herein because such processes and materials may vary somewhat. It is also to be understood that the terminology used herein is used for the purpose of describing particular examples only. The terms are not intended to be limiting because the scope of the present disclosure is intended to be limited only by the appended claims and equivalents thereof.

EXAMPLES

Example 1: Latex Binder

Two examples of latex binder were prepared (latex binder I and latex binder II). The polymer particles of example I were formed with two different streams of monomers. One monomer stream included a solution of soft component monomers (i.e., monomers suitable for forming the first heteropolymer composition disclosed herein), and the other monomer stream included an emulsion of several hard and/or hydrophobic component monomers and an additional monomer (i.e., monomers suitable for forming the second heteropolymer composition disclosed herein). The latex particles of example I were prepared as follows. Deionized water (58.6 g) was heated to 77° C. with mechanical agitation in a reactor. At 77° C., latex seed (5.0 g at 49% solids; 67 nm particle size) was added to the reactor. Also at 77° C., potassium persulfate (0.2 g) dissolved in water (4% solution) was added. Three streams were added to the reactor: (A) a monomer solution including methyl methacrylate (12.1 g), butyl acrylate (22.4 g), and methacrylic acid (0.54 g); (B) a solution of copolymerizable surfactant (Hitenol® AR-1025) (1.75 g) dissolved in water (5.0 g); and (C) a solution of potassium persulfate (0.2 g) dissolved in water (10.0 g). Streams (A) and (B) were added over 105 minutes. Stream (C) was initiated with streams (A) and (B), but with a targeted feed time of 360 minutes. When streams (A) and (B) were completed, the reaction was held at 77° C. for one hour (stream (C) continued to feed during this time). After the one hour period, a new feed (D) was fed over 195 minutes. Feed (D) included an aqueous emulsion of water (30 g), copolymerizable surfactant (Hitenol® AR-1025) (7.0 g), cyclohexyl methacrylate (45.1 g), cyclohexyl acrylate (6.5 g), phenoxyethyl methacrylate (9.1 g), and methacrylic acid (2.6 g). Residual monomer was reduced by adding cyclohexyl acrylate (0.92 g) after increasing the temperature to 85° C. The temperature was held at 85° C. for one hour, followed by the addition of a 5% solution of ascorbic acid (4.2 g) and a 5% solution of tert-butyl hydroperoxide (8.4 g) at 70° C. After cooling to near ambient temperature, the pH was adjusted to 8 with dilute potassium hydroxide; and inkjet suitable aqueous biocides were added. The resulting polymer particles included two heteropolymer phases—one of methyl methacrylate, butyl acrylate, and methacrylic acid and the other of cyclohexyl methacrylate, cyclohexyl acrylate, phenoxyethyl methacrylate, and methacrylic acid. The example polymer particles were present in an emulsion (i.e., a latex emulsion), and made up 42.4% solids by total weight of the latex emulsion. The particle size of the example polymer particles was 0.215 μm (particle size determined using Microtrac Nanotrac Wave II), and the viscosity (at 25° C.) of the latex emulsion was less than 50 cps.

The polymer particles of example II were formed with two different streams of monomers. One monomer streams included a solution of soft component monomers (i.e., monomers suitable for forming the first heteropolymer composition disclosed herein), and the other monomer stream included an emulsion of several hard component monomers and an additional monomer (i.e., monomers suitable for forming the second heteropolymer composition disclosed herein). The polymer particles of example II were prepared as follows. Deionized water (62.6 g) was heated to 77° C. with mechanical agitation in a reactor. At 77° C., latex seed (5.0 g at 49% solids; 67 nm particle size) was added to the reactor. Also at 77° C., potassium persulfate (0.2 g) dissolved in water (4% solution) was added. Three streams were added to the reactor: (A) a monomer solution including butyl methacrylate (20.6 g), butyl acrylate (13.8 g), and methacrylic acid (0.54 g); (B) a solution of copolymerizable surfactant (HITENOL® AR-1025) (2.24 g) dissolved in water (10.0 g); and (C) a solution of potassium persulfate (0.2 g) dissolved in water (10.0 g). Streams (A) and (B) were added over 105 minutes. Stream (C) was initiated with streams (A) and (B), but with a targeted feed time of 360 minutes. When streams (A) and (B) were completed, the reaction was held at 77° C. for one hour (stream (C) continued to feed during this time). After the one-hour period, a new feed (D) was fed over 195 minutes. Feed (D) included an aqueous emulsion of water (30 g), copolymerizable surfactant (HITENOL® AR-1025) (7.0 g), cyclohexyl methacrylate (45.1 g), cyclohexyl acrylate (6.5 g), phenoxyethyl methacrylate (9.1 g), and methacrylic acid (2.6 g). Residual monomer was reduced by adding cyclohexyl acrylate (0.92 g) after increasing the temperature to 85° C. The temperature was held at 85° C. for one hour, followed by the addition of a 5% solution of ascorbic acid (4.2 g) and a 5% solution of tert-butyl hydroperoxide (8.4 g) at 70° C. After cooling to near ambient temperature, the pH was adjusted to 8 with dilute potassium hydroxide; and inkjet suitable aqueous biocides were added. The resulting polymer particles included a two heteropolymer phases—one of butyl methacrylate, butyl acrylate, and methacrylic acid and the other of cyclohexyl methacrylate, cyclohexyl acrylate, phenoxyethyl methacrylate, and methacrylic acid. The example polymer particles were present in an emulsion (i.e., a latex emulsion), and made up 42.5% solids by total weight of the latex emulsion. The particle size of the example polymer particles was 0.222 μm (particle size determined using Microtrac Nanotrac Wave II), and the viscosity (at 25° C.) of the latex emulsion was less than 20 cps.

Example 2: Inkjet Ink Compositions

Example inkjet inks compositions according to the present disclosures were formulated with the latex binder particles of examples I and II. The formulations are shown in Table 3. Each number represents the wt % of each component present in the example (with respect to the total weight of the respective ink composition).

The white pigment is an alumina and silica coated white pigment that is commercially available from Chemours under the Trade name TiPure® R-960 (The wt % of the pigment represents the percentage of the solid pigment particles). The alumina dispersion is made in a 10 wt % suspension with water. The alumina (Boehmite Amphoteric Alumina Particles (50 nm) is obtained from Sasol, under the tradename Dispal® 23N4-80 which comes as a dry powder. This dispersion is pre-neutralized with nitric acid (by Sasol) so the powder will disperse easily when mixed with water.

TABLE 3

| Specific Component | Ingredients | Ex. Ink 1 | Ex. Ink 2 |
|---|---|---|---|
| Latex from example 1 | Latex binder | 10.0% | — |
| Latex from example 2 | Latex binder | — | 11.0% |
| Ti-Pure ® R-960 | Coated White Pigment | 11.3% | 12.0% |
| BYK Disperbyk-190 | dispersants | 0.10% | 0.10% |
| Carbosperse ® K-7028 | dispersants | 0.06% | 0.06% |
| 1,2-Butanediol | Co-solvent (170° C. ≤ BP ≤ 215° C.) | 14.0% | 15.0% |
| 2-pyrrolidone | Co-solvent (220° C. ≤ BP ≤ 285° C.) | 3.00% | 3.00% |
| Dowanol ® TPM | Co-solvent (220° C. ≤ BP ≤ 285° C.) | 1.80% | 0.90% |
| Dowanol ® TPnB | Co-solvent (220° C. ≤ BP ≤ 285° C.) | 0.30% | — |
| Tergitol ® 15-S-7 | Surfactants | 0.40% | 0.40% |
| Capstone ® FS-35 | Surfactants | 0.30% | 0.30% |
| Dispal ® 23N4-80 | Alumina Dispersion | 0.31% | 0.15% |
| Potassium Sulfate | | — | 0.09% |
| Water | | Up to 100% | Up to 100% |

BYK Disperbyk-190 is available from BYK Chemie; Carbosperse K-7028 is available from Lubrizol Corporation; Dowanol is available from Dow Chemical Company; Dowanol® TPnB is available from Dow Chemical Company; Tergitol® 15-S-7 is available from Dow Chemical Company; Capstone® FS-35 is available from Sasol Germany. Ti-Pure® R-960 is available from Chemours. Dispal® 23N4-80 is available from Sasol.

Example 3: Inkjet Ink Compositions Performances

Example inks 1 and 2 were printed on flexible media (self-adhesive vinyl (SAV) and polyethylene terephthalate (PET)) and rigid media (polypropylene), and the different prints were exposed to several different tests. The inks were tested for color retention and substrate adhesion performances.

Example inks 1 and 2 were thermal inkjet printed on 3M IJ180c Controltac cast SAV, cured, and dried. The printed samples were 150 mm×20 mm color swatches. The printed samples were then stretched on an Instron tester at 300 mm/minute. The printed samples were run at 0%, 15%, 30%, 60% and 90% elongation. For example, at 90% elongation, the printed sample was elongated from 150 mm to 285 mm. L*a*b* was measured at 5 locations along each printed sample both before and after elongation. The change in color (ΔE from Lab measurements relative to the un-stretched sample) was then plotted versus Media Elongation Percentage. The results demonstrated that the tested inks showed good performance in term of in terms of color retention on flexible media after elongation.

Example inks 1 and 2 were thermal inkjet printed on rigid, fluted polypropylene (i.e., IntePro® Fluted Polypropylene), cured and dried. The printed samples were then tested for adhesion. A cross hatch tape adhesion test was carried out as defined in ASTM D3359 09, except that Intertape Polymer Group® 515965 tape was used in place of Permacel® P99 test tape. The tested ink showed excellent adhesion (Printed Ink Removal performance) since 0% of the printed ink was removed.

Example 4: Ink System Performances

An example of an inkjet printing systems was made that include: Example ink 1, a pre-treatment composition and an overcoat composition.

The pre-treatment composition used herein comprises 2.45 wt % of a cationic polymer (Floquat® FL2350); 20 wt % of 1,2-butanediol; 2.5 of wt % surfactant with the balance being water.

The overcoat composition used herein contains 3 wt % of wax (Liquilube® 405 available from Lubrizol); 9 wt % of latex (consisting primarily of poly-cyclohexylmethacrylate), 18 wt % of 1,2-butanediol, 5 wt % of 2-pyrrolidinone, 2 wt % Dowanol® TPM (tripropylene glycol methyl ether), 1.3 wt % Dowanol® TPnB (tripropylene glycol n-butyl ether), surfactants and water. The amount of each of the solvents is provided by total weight of the composition with the balance of each of the compositions (comprising the components specified) is water.

Each inkjet printing system was used to print an image on a print substrate by applying the pre-treatment fluid to the print substrate (rigid polypropylene) to form a pre-treatment layer disposed on the print substrate. The inkjet ink composition was then inkjet-printed to the pre-treatment later disposed on the print substrate to form an ink later disposed on the pre-treatment layer. The overcoat composition was then inkjet-printed to the ink layer to form an overcoat layer disposed on the ink layer. During printing of the inkjet ink composition and the overcoat vehicle the print substrate along with the layers disposed thereon was heated to evaporate water from the printed layers. The layered composition was then dried further in a curing zone to evaporate the water and the solvents and cure the latex polymers.

Adhesion to the print substrate, rub resistance of the printed image along with printhead reliability (decap performance) was evaluated.

Adhesion was measured with using the cross-hatch tape adhesion test which was carried out as defined in ASTM D3359-09, except that Intertape Polymer Group® 515965 tape was used in place of Permacel® P99 test tape. Windex Blue® window cleaner and 70% isopropyl alcohol rub resistance were measured using a Taber® linear abraser model 5750 equipped with an acrylic crockmeter tip covered with polyester cloth. The cloth was dipped in the rubbing fluid, and the printed image was rubbed 5× with 600 g pressure. Decap was measured by printing the compositions from an inkjet printhead and then waiting for 7 seconds, and then counting the number of spits (printhead firings) required to bring the nozzle back to full health, as measured by looking at printed line health (density and trajectory).

The obtained results showed that the inkjet printing system comprising a pre-treatment fluid, inkjet ink composition and inkjet overcoat composition as described herein provides improved substrate adhesion, rub resistance, printhead reliability.

The invention claimed is:

1. An inkjet ink composition comprising:
   a. an ink vehicle including water;
   b. a white metal oxide pigment dispersed in the ink vehicle; and
   c. a latex binder dispersed in the ink vehicle including:
      i. a first heteropolymer including two or more aliphatic (meth)acrylate ester monomers or two or more aliphatic (meth)acrylamide monomers; and
      ii. a second heteropolymer including a cycloaliphatic monomer and an aromatic monomer.

2. The inkjet ink composition of claim 1 wherein, in the latex binder, the second heteropolymer composition includes a cycloaliphatic monomer that is selected from the group consisting of a cycloaliphatic (meth)acrylate monomer and a cycloaliphatic (meth)acrylamide monomer.

3. The inkjet ink composition of claim 1 wherein, in the latex binder, the second heteropolymer composition includes an aromatic monomer being selected from the group consisting of an aromatic (meth)acrylate monomer and an aromatic (meth)acrylamide monomer.

4. The inkjet ink composition of claim 1 wherein, in the latex binder, the first heteropolymer is present in an amount ranging from about 15 wt % to about 70 wt % of a total weight of the latex binder and the second heteropolymer is present in an amount ranging from about 30 wt % to about 85 wt % of a total weight of the latex binder.

5. The inkjet ink composition of claim 1 wherein in the first heteropolymer of the latex binder, the two or more aliphatic (meth)acrylate ester monomers are linear aliphatic (meth)acrylate ester monomers, cycloaliphatic (meth)acrylate ester monomers, or combinations thereof; or the two or more aliphatic (meth)acrylamide monomers are selected from the group consisting of $C_1$ to $C_8$ alkyl acrylamide monomers and $C_1$ to $C_8$ alkyl methacrylamide monomers.

6. The inkjet ink composition of claim 1 wherein in the second heteropolymer composition of the latex binder:
   a. the cycloaliphatic monomer is selected from the group consisting of cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof; and
   b. the aromatic monomer is selected from the group consisting of 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, and combinations thereof.

7. The inkjet ink composition of claim 1 wherein the latex binder is present in an amount ranging from about 5 wt % to about 35 wt % of a total weight of the inkjet ink composition.

8. The inkjet ink composition of claim 1 wherein the white metal oxide pigment has an average particle size ranging from about 200 nm to about 700 nm, and includes titanium dioxide particles, zinc oxide particles, zirconium oxide particles, or combinations thereof.

9. The inkjet ink composition of claim 1 wherein the white metal oxide pigment has an alumina coating and is present in an amount representing from about 5 wt % to about 25 wt % of the total ink weight.

10. The inkjet ink composition of claim 1 further comprising from about 0.2 wt % to about 1.5 wt % of monovalent metal salt, or from about 0.001 wt % to about 0.3 wt % of a divalent metal salt, or both.

11. The inkjet ink composition of claim 1 further comprising from about 0.05 wt % to about 0.5 wt % of amphoteric alumina particles dispersed in the aqueous ink vehicle.

12. A method of printing comprising:
    a. providing a print media substrate;
    b. providing an inkjet ink composition comprising an ink vehicle including water; a white metal oxide pigment dispersed in the ink vehicle; and a latex binder dispersed in the ink vehicle including a first heteropolymer including two or more aliphatic (meth)acrylate ester monomers or two or more aliphatic (meth)acrylamide monomers; and a second heteropolymer including a cycloaliphatic monomer and an aromatic monomer;
    c. inkjet printing the ink composition to the print substrate to form an ink layer disposed on the print media substrate.

13. The method of printing of claim 12 wherein the print media substrate is a non-porous printing substrate.

14. The method of printing of claim 12 further comprising a pre-treatment of the print substrate with an aqueous pre-treatment fluid comprising a cationic polymer and a pre-treatment vehicle.

15. The method of printing of claim 12 further comprising a post-treatment of the ink layer with an aqueous overcoat composition comprising a latex polymer, a wax and an overcoat vehicle.

* * * * *